(12) United States Patent
Marques et al.

(10) Patent No.: US 9,958,996 B2
(45) Date of Patent: May 1, 2018

(54) CAPACITIVE TOUCH SENSOR

(71) Applicant: Displax S.A., Braga (PT)

(72) Inventors: Pedro Luis Fernandes Marques, Guimarães (PT); Miguel Angelo Magalhaes Fonseca, Braga (PT); José Miguel Fernandes Peixoto de Oliveira, Santo Tirso (PT); António Augusto Babo de Carvalho, Braga (PT)

(73) Assignee: Displax S.A., Braga (PT)

( * ) Notice: Subject to any disclaimer, the term of this patent is extended or adjusted under 35 U.S.C. 154(b) by 0 days. days.

(21) Appl. No.: 15/010,086

(22) Filed: Jan. 29, 2016

(65) Prior Publication Data

US 2017/0220146 A1 Aug. 3, 2017

(51) Int. Cl.
*G06F 3/044* (2006.01)

(52) U.S. Cl.
CPC .... *G06F 3/044* (2013.01); *G06F 2203/04112* (2013.01)

(58) Field of Classification Search
CPC ........... G06F 3/044; G06F 2203/04112; G06F 2203/04101; G06F 2203/04111; G06F 2203/04103
USPC ...................... 345/173–179; 178/18.01–18.09
See application file for complete search history.

(56) References Cited

U.S. PATENT DOCUMENTS

| | | | |
|---|---|---|---|
| 6,198,469 B1 | 3/2001 | Tjandrasuwita | |
| 7,202,859 B1 | 4/2007 | Speck et al. | |
| 8,599,161 B2 | 12/2013 | Philipp | |
| 8,610,443 B1 | 12/2013 | Ryshtun et al. | |
| 8,836,669 B1 | 9/2014 | Pgirko et al. | |
| 2005/0122785 A1 | 6/2005 | Umeda et al. | |
| 2008/0150906 A1 | 6/2008 | Grivna | |
| 2009/0322351 A1 | 12/2009 | Mcleod | |
| 2011/0234508 A1 | 9/2011 | Oda | |

(Continued)

FOREIGN PATENT DOCUMENTS

| | | |
|---|---|---|
| GB | 2502594 | 12/2013 |
| KR | 2011127101 | 11/2011 |

(Continued)

OTHER PUBLICATIONS

European Search Report in European Application No. 17398001, dated May 24, 2017, 10 pages.

(Continued)

*Primary Examiner* — Stacy Khoo
(74) *Attorney, Agent, or Firm* — Fish & Richardson P.C.

(57) ABSTRACT

A capacitive touch sensor is described. The touch sensor includes a sensor grid that includes a trace that has a trace start point and end point, is electrically conductive between the trace start point and the trace end point, is formed in one or more pairs of trace cells that each include a first trace cell and a second trace cell that is rotationally symmetrical to the first trace cell. The trace start point and the trace end point define a trace axis. A trace direction is defined from the trace start point to the trace end point. A trace-perpendicular direction is defined as being perpendicular to the trace direction. A segment of the trace that is formed in the first trace cell includes a first portion, a second portion, a third portion, a fourth portion, a fifth portion, a sixth portion, a seventh portion, and an eighth portion.

17 Claims, 14 Drawing Sheets

(56) References Cited

U.S. PATENT DOCUMENTS

| | | |
|---|---|---|
| 2011/0254802 A1 | 10/2011 | Philipp |
| 2011/0273192 A1 | 11/2011 | Huang et al. |
| 2011/0291966 A1 | 12/2011 | Takao et al. |
| 2011/0310037 A1 | 12/2011 | Moran et al. |
| 2012/0050229 A1 | 3/2012 | Tenuta et al. |
| 2013/0017321 A1 | 1/2013 | Kim et al. |
| 2013/0032414 A1 | 2/2013 | Yilmazetal |
| 2013/0044384 A1 | 2/2013 | Kim et al. |
| 2013/0076646 A1 | 3/2013 | Krah et al. |
| 2013/0113502 A1 | 5/2013 | Yilmaz et al. |
| 2013/0127772 A1 | 5/2013 | Guard et al. |
| 2013/0207911 A1* | 8/2013 | Barton .................. G06F 3/0488 345/173 |
| 2013/0307601 A1 | 11/2013 | Castor-Perry |
| 2014/0041924 A1 | 2/2014 | Cok |
| 2014/0055380 A1 | 2/2014 | Han |
| 2014/0055403 A1 | 2/2014 | Cok |
| 2014/0078101 A1 | 3/2014 | Katsurahira |
| 2014/0125623 A1 | 5/2014 | Atkinson et al. |
| 2014/0210784 A1 | 7/2014 | Gourevitch |
| 2014/0218645 A1 | 8/2014 | Miyamoto |
| 2015/0035794 A1 | 2/2015 | Zhitomirskiy |
| 2015/0358014 A1 | 12/2015 | Marques et al. |
| 2016/0282985 A1 | 9/2016 | Marques et al. |

FOREIGN PATENT DOCUMENTS

| | | |
|---|---|---|
| WO | 2001027868 | 10/2002 |
| WO | 2014001405 | 1/2014 |
| WO | 2014021168 | 2/2014 |

OTHER PUBLICATIONS

European Search Report issued in European Application No. 15398006.5 dated Sep. 30, 2015, 4 pages.
European Search Report in European Application No. EP 16398003, dated Aug. 19, 2016, 1 page.
European Search Report in European Application No. EP 16398004, dated Aug. 19, 2016, 1 page.

* cited by examiner

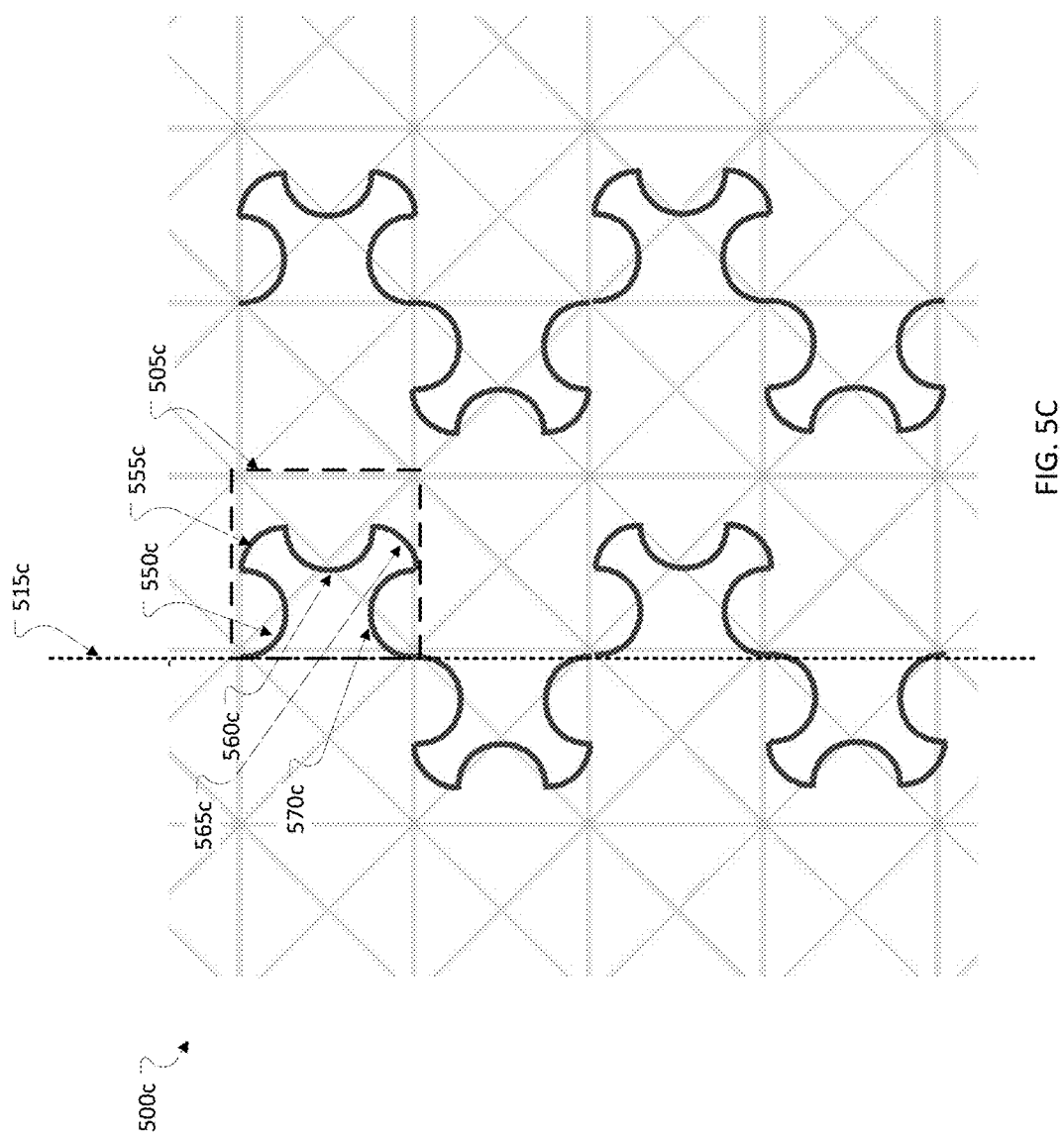

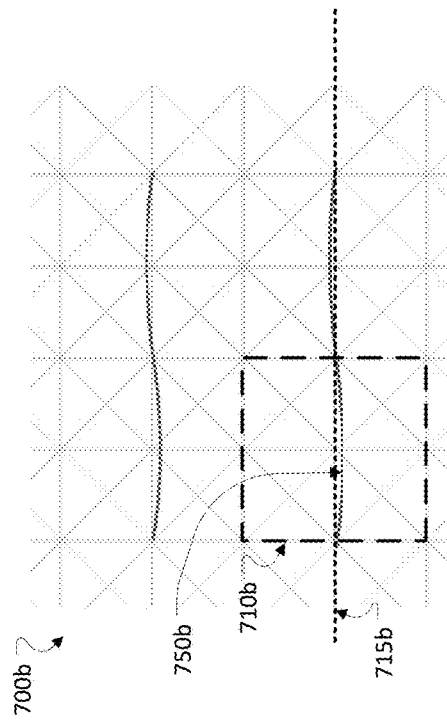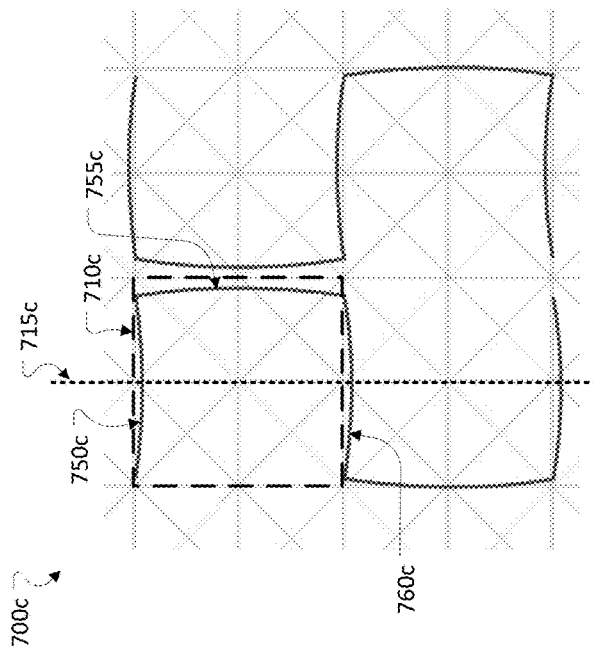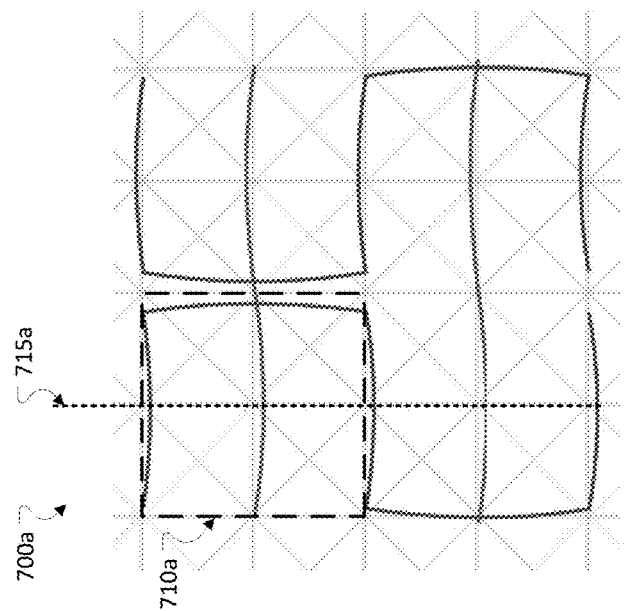

CAPACITIVE TOUCH SENSOR

TECHNICAL FIELD

The present disclosure relates to a projected capacitive touch sensor.

BACKGROUND

Touch-sensitive displays are widely employed for an expanding variety of applications ranging from mobile devices to fixed devices.

Projected Capacitive Technology (PCT) is becoming one of the most significant touch technologies for applications ranging from mobile devices to collaborative business and development. PCT refers to two main sensing methods called "self-capacitance" and "mutual capacitance" offering different performance characteristics and applications. Driven by the increasing number of users of touch-enabled mobile devices, consumer and professional expectations for touch applications have moved far beyond single-touch requirements into the realm of multi-touch and multi-user capabilities.

SUMMARY

To detect touches on a display screen, a touch sensor grid is overlaid on top of the display screen such that the sensor grid is between the user and the display screen. The traces may consist of patterns with straight lines and sharp corners or patterns with curved lines. Each trace for the sensor grids exhibits bilateral symmetry, rotational symmetry, or both. The traces different trace patterns each have benefits and drawbacks related to production time, production cost, visual interference, and accuracy.

An innovative aspect of the subject matter described in this specification may be implemented in a projected capacitive touch sensor that includes a sensor grid that includes a trace that (i) has a trace start point and a trace end point, (ii) is electrically conductive between the trace start point and the trace end point, (iii) is formed in one or more pairs of trace cells that each include a first trace cell and a second trace cell that is rotationally symmetrical to the first trace cell, where the trace start point and the trace end point define a trace axis, where a trace direction is defined from the trace start point to the trace end point, where a trace-perpendicular direction is defined as being perpendicular to the trace direction, where a segment of the trace that is formed in the first trace cell includes a first portion of the trace that starts at a first point on the trace axis and that is formed in the trace direction and in the trace-perpendicular direction; a second portion of the trace that starts at an end point of the first portion and that is formed in a direction opposite the trace direction and in the trace-perpendicular direction; a third portion of the trace that starts at an end point of the second portion and that is formed in the trace direction and in the trace-perpendicular direction; a fourth portion of the trace that starts at an end point of the third portion and that is formed in the trace direction and in a direction opposite the trace-perpendicular direction; a fifth portion of the trace that starts at an end point of the fourth portion and that is formed in the trace direction and the trace-perpendicular direction; a sixth portion of the trace that starts at an end point of the fifth portion and that is formed in the trace direction and the direction opposite trace-perpendicular direction; a seventh portion of the trace that starts at an end point of the sixth portion and that is formed in the direction opposite the trace direction and the direction opposite trace-perpendicular direction; and an eighth portion of the trace that starts at an end point of the seventh portion, that ends at a second point on the trace axis, and that is formed in the trace direction and the direction opposite trace-perpendicular direction.

These and other implementations can each optionally include one or more of the following features. A width of the trace is between one micrometer and twenty micrometers. The sensor further includes additional traces that each have trace axes that are approximately parallel to the trace axis of the trace. The sensor further includes additional traces that each (i) have trace axes that are approximately perpendicular to the trace axis of the trace and (ii) are radially symmetrical to the trace.

Another innovative aspect of the subject matter described in this specification may be implemented in a projected capacitive touch sensor that includes a sensor grid that includes a trace that (i) has a trace start point and a trace end point, (ii) is electrically conductive between the trace start point and the trace end point, (iii) is formed in one or more pairs of trace cells that each include a first trace cell and a second trace cell that is rotationally symmetrical to the first trace cell, where the trace start point and the trace end point define a trace axis, where a trace direction is defined from the trace start point to the trace end point, where a trace-perpendicular direction is defined as being perpendicular to the trace direction, where a segment of the trace that is formed in the first trace cell includes a first portion of the trace that starts at a first point on the trace axis and that is formed in the trace direction and in the trace-perpendicular direction; a second portion of the trace that starts at an end point of the first portion and that is formed in a direction opposite the trace direction and in the trace-perpendicular direction; a third portion of the trace that starts at an end point of the second portion and that is formed in the trace direction and in the trace-perpendicular direction; a fourth portion of the trace that starts at an end point of the third portion, that ends at a second point on the trace axis, and that is formed in the trace direction and in a direction opposite the trace-perpendicular direction.

These and other implementations can each optionally include one or more of the following features. A width of the trace is between one micrometer and twenty micrometers. The sensor further includes additional traces that each have trace axes that are approximately parallel to the trace axis of the trace. The sensor further includes additional traces that each (i) have trace axes that are approximately perpendicular to the trace axis of the trace and (ii) are radially symmetrical to the trace. A length of the fourth portion is at least twice a length of the first portion, the second portion, or the third portion.

Another innovative aspect of the subject matter described in this specification may be implemented in a projected capacitive touch sensor that includes a sensor grid that includes a trace that (i) has a trace start point and a trace end point, (ii) is electrically conductive between the trace start point and the trace end point, (iii) is formed in one or more pairs of trace cells that each include a first trace cell and a second trace cell that is rotationally symmetrical to the first trace cell, where the trace start point and the trace end point define a trace axis, where a trace direction is defined from the trace start point to the trace end point, where a trace-perpendicular direction is defined as being perpendicular to the trace direction, where a segment of the trace that is formed in the first trace cell includes a first portion of the trace that starts at a first point on the trace axis and that is formed in the trace direction and in the trace-perpendicular direction; a second portion of the trace that starts at an end point of the first portion and that is formed in the trace direction and in a direction that is opposite the trace-perpendicular direction; a third portion of the trace that starts at an end point of the second portion and that is formed in the trace direction and in the trace-perpendicular direction; a fourth portion of the trace that starts at an end point of the third portion, that ends at a second point on the trace axis, and that is formed in the trace direction and in the direction opposite the trace-perpendicular direction.

These and other implementations can each optionally include one or more of the following features. A width of the trace is between one micrometer and twenty micrometers. The sensor further includes additional traces that each have trace axes that are approximately parallel to the trace axis of the trace. The sensor further includes additional traces that each (i) have trace axes that are approximately perpendicular to the trace axis of the trace and (ii) are radially symmetrical to the trace.

Another innovative aspect of the subject matter described in this specification may be implemented in a projected capacitive touch sensor that includes a sensor grid that includes a trace that (i) has a trace start point and a trace end point, (ii) is electrically conductive between the trace start point and the trace end point, (iii) is formed in one or more pairs of trace cells that each include a first trace cell and a second trace cell that is rotationally symmetric to the first trace cell, where the trace start point and the trace end point define a trace axis, where a trace direction is defined from the trace start point to the trace end point, where a trace-perpendicular direction is defined as being perpendicular to the trace direction, where a segment of the trace that is formed in the first trace cell includes a first curved portion of the trace that starts at a first point on the trace axis and that is concave in a direction opposite the trace direction; a second curved portion of the trace that starts at an end point of the first curved portion and that is convex in a direction opposite the trace direction and in the trace-perpendicular direction; a third curved portion of the trace that starts at an end point of the second curved portion and that is concave in the trace-perpendicular direction; a fourth curved portion of the trace that starts at an end point of the third curved portion and that is convex in the trace direction and in the trace-perpendicular direction; a fifth curved portion of the trace that starts at an end point of the fourth curved portion, that ends at a second point on the trace axis and that is concave in the trace direction.

These and other implementations can each optionally include one or more of the following features. A width of the trace is between one micrometer and twenty micrometers. The sensor further includes additional traces that each have trace axes that are approximately parallel to the trace axis of the trace. The sensor further includes additional traces that each (i) have trace axes that are approximately perpendicular to the trace axis of the trace and (ii) are radially symmetrical to the trace. The first curved portion, the second curved portion, the third curved portion, the fourth curved portion, and the fifth curved portion are arcs with a same radius. The first curved portion, the third curved portion, and the fifth curved portion are arcs with a first radius. The second curved portion and the fourth curved portion are arcs with a second radius that is greater than the first radius. The first curved portion, the third curved portion, and the fifth curved portion are arcs with a first radius. The second curved portion and the fourth curved portion are arcs with a second radius that is less than the first radius.

Other implementations of these aspects include corresponding systems, apparatus, and computer programs recorded on computer storage devices, each configured to generate these sensors.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF DRAWINGS

FIGS. 5A, 6, 7A, and 8-10 illustrate example sensor patterns.

FIGS. 5B and 7B illustrate example row patterns of example sensor patterns.

FIGS. 5C and 7C illustrate example column patterns of example sensor patterns.

DETAILED DESCRIPTION

The present disclosure relates to a projected capacitive touch sensor.

Figure 1:
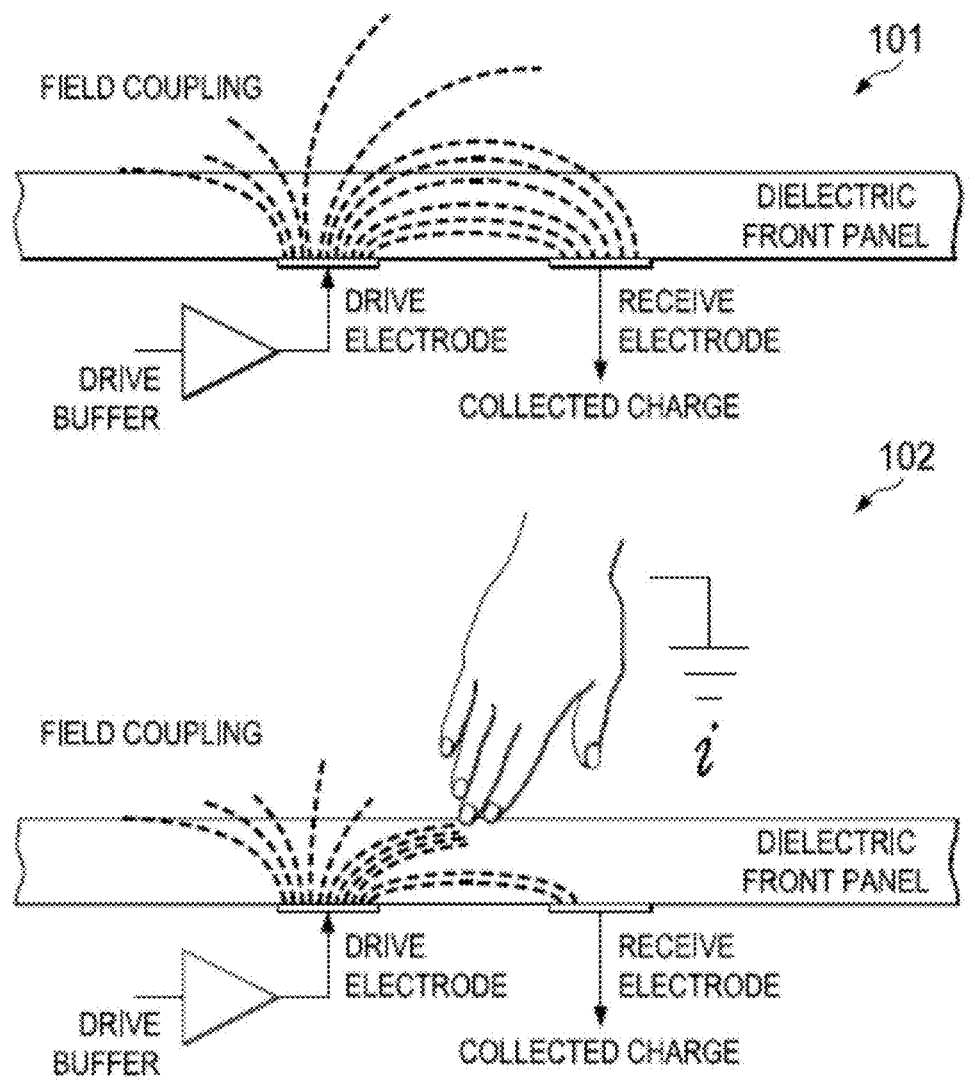
FIG. 1 illustrates how projected capacitive touch sensing works.

FIG. 1 illustrates the working principles of projected capacitive touch sensing technology. 101 is the sensor without an external conductive object in close proximity, while 102 is the sensor with an external conductive object in close proximity. PCT may be based on a grid (or matrix) made of electrically conductive material, having this material as columns and rows. The columns and rows may serve as electrodes. The detection method may be based on interference caused by an external conductive touch object (e.g., finger or conductive pointer that are grounded) on the electrostatic field generated between the rows and columns, more precisely at the interceptions between rows and columns—these interceptions may be designated as nodes. These nodes, electrically speaking, may behave like capacitors, with very low charge capacity, in the pico Farad (pF) range, and with charge variation in the femto Farad (fF) range when externally disturbed (for instance, when touching with the external object). In other words, PCT detects touch by measuring the capacitance at each addressable electrode. When a finger or a conductive object approaches an electrode, it disturbs the electromagnetic field and alters the capacitance. This change in capacitance can be measured by the electronics and then converted into X, Y locations that the system can use to detect touch.

Figure 2:
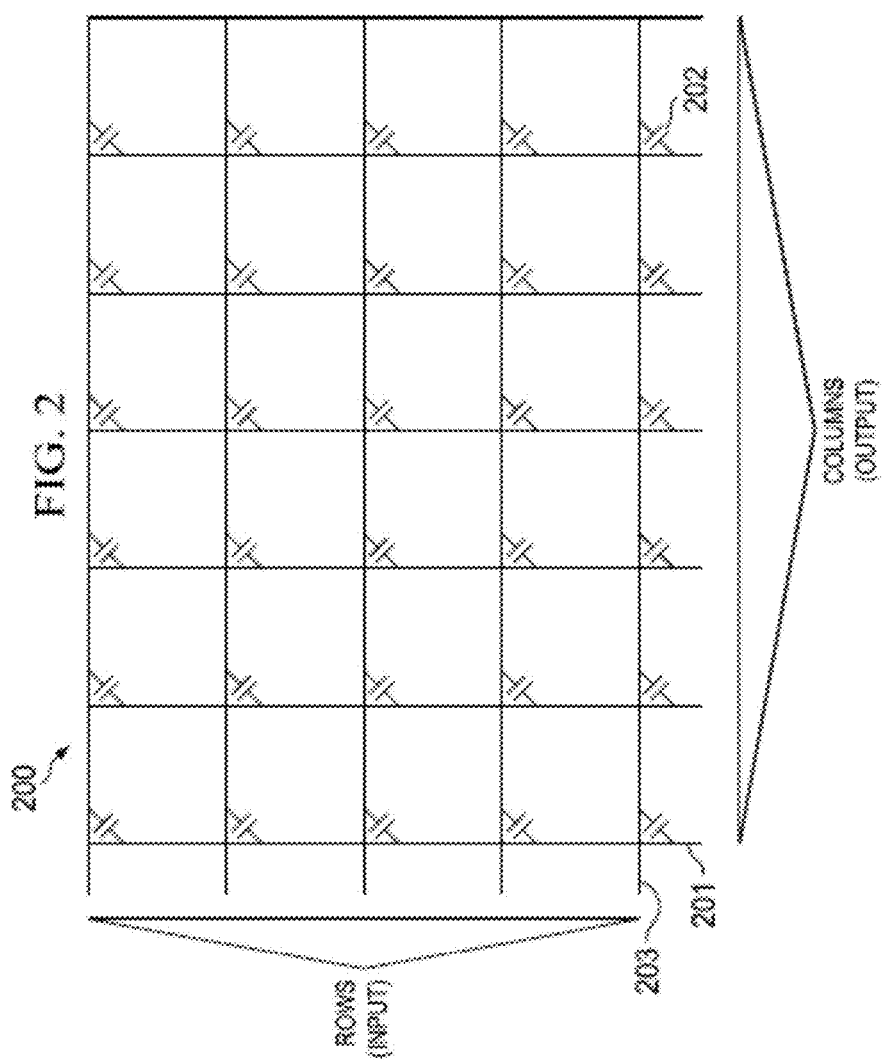
FIG. 2 illustrates components of a projected capacitive touch sensor.

FIG. 2 illustrates components of a projected capacitive touch sensor 200. In an aspect, an alternate current signal is injected (AC signal) in one of the rows 203 and, on each column 201, one may find the same signal with a fraction of the injected signal amplitude. The signal amplitude obtained on each column is the result of the original AC signal passing through the capacitor 202 created at the node (interception) between the selected row and the column. This sensor output amplitude may vary between columns due to physical and electrical differences that may exist for among columns (e.g., equivalent capacitors to each node have different charge capacities, thereof, different output signal values or amplitudes). For example, the electrical signal may be injected in the rows and collected at the columns, but the process works in reverse (one can inject the signals in the columns and collect it at the rows).

The signal amplitude at the columns output may be changed (e.g., it will be smaller or larger) when a conductive object, exterior to the grid, disturbs the electrostatic field created at the node between the row and column. This conductive object is, in this circuit context, the touching or "getting near" finger in the grid which will divert part of that electrostatic field to earth/ground. One may use this difference of signal amplitude (amplitude without touch minus amplitude with touch) to identify the presence of an exterior conductive object, thus, the existence of a touch event.

There are two main types of sensing methods, self-capacitance and mutual capacitance, where each has its own advantages and disadvantages. While for self-capacitance, each electrode is scanned individually, in mutual capacitance each electrode node or intersection is scanned for the determination of a touch event. Mutual capacitance may allow an unlimited number of unambiguous touches, may produce higher resolution than self-capacitance and may be less sensitive to electromagnetic interference (EMI) than self-capacitance. In self-capacitance, due to the scanning method, so-called ghost points may occur so that it may not be possible to unambiguously detect more than one touch event when using rows and columns. However, both types of sensing methods are based on a charge transfer between human-body or touch object and either single electrode or pair of electrodes.

Mutual capacitance is the intentional or unintentional capacitance between two "charge holding objects." Projected capacitance touch-screens intentionally create mutual capacitance between elements of columns and rows in the vicinity where each intersect the other. This allows the system electronics to measure each node (intersection) individually to detect multiple touches on the screen during one screen scan. When a touch object touches near an intersection or node, some of the mutual capacitance between the row and column is coupled to the touch object, which reduce the capacitance at the intersection as measured by the system electronics. This reduced capacitance crosses the "touch threshold" set by the electronics indicating a touch has occurred.

Touch sensors based on PCT may be scanned as mentioned above. The term "scanned" as used herein may mean that individual electrodes (e.g. rows or columns) intersections or nodes are measured, e.g. one-by-one in a cycle. Mutual-capacitance touch screens may use a scanning method that measures the capacitance at each row and column intersection. In this scanning method, the controller drives a single column (Y) and then scans every row (X) (or vice versa) that intersects with that column, measuring the capacitance value at each X-Y intersection. This process may be repeated for every column and then the entire cycle starts over. The scanning rate may be more than 20 Hz, for example, up to 200 Hz, 400 Hz, or 500 Hz. The sensor grid may have any number of columns and rows, for example, 64-700 columns and 36-400 rows, for example 168 columns and 96 rows.

Figure 3A:
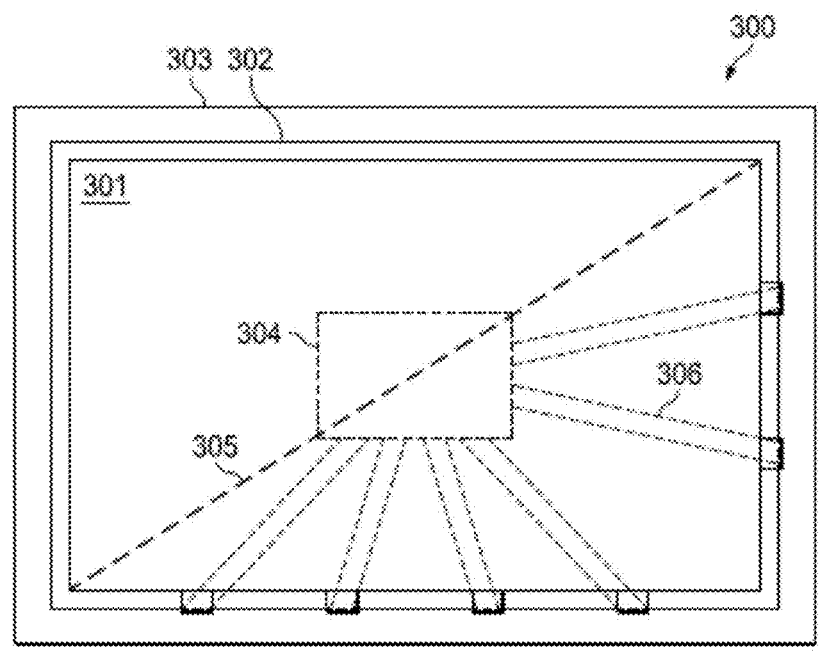
FIG. 3A illustrates a front view of a touch display device based on a projected capacitive touch sensor.
Figure 3B:
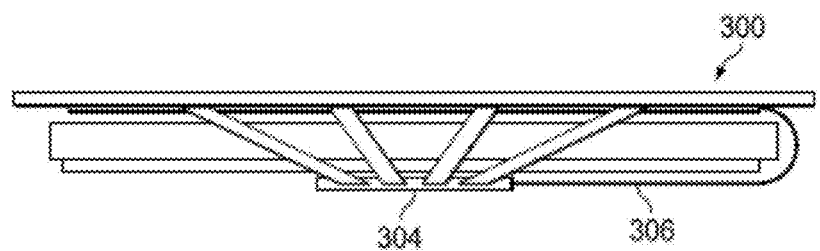
FIG. 3B illustrates a top view of a touch display device based on a projected capacitive touch sensor.

FIG. 3A illustrates a front view of the projected capacitive touch display device 300 and FIG. 3B illustrates a top view of the projected capacitive touch display device 300. The projected capacitive touch sensor may include a sensor grid 301 with diagonal 305, a display layer 302, a glass (or other transparent, non-conductive material, like acrylic) cover layer 303, one or more controllers 304 and one or more flexible cables 306. The controller, despite being shown at the back of the display, can be located anywhere as long as the flexible cables 306 coming from the sensor film can reach it. Not shown here is the host system (e.g., a regular PC) where the controller 304 and the display 302 are connected. The sensor grid 301 may be laminated to the glass 303 (or other transparent, non-conductive material, like acrylic). The diagonal 305 may exceed 32 inches, preferably may be 40 inches to 90 inches, more preferably may be up to 150 inches.

The layers forming the sensor grid 301, after being stacked up, may create a grid of interceptions between the conductive material (e.g., copper, gold, silver, carbon nanotubes, graphene; generically any conductive material which may allow fine traces, e.g. below 10 µm in width) rows and columns, which are previously created in one or more row or column layers by deposition, printing, etching, electroplating or other method of making conductive structures in (e.g. flexible) substrates (e.g.). Additionally, conductive connecting traces (e.g. buses) are also created at the borders in order to allow the electrical connection of the rows/columns to the flexible cables which will, then, connect to the controller. The rows and their traces may not directly (e.g., conductively) touch/connect electrically to the columns and column traces, e.g., there must may be electrical isolation between rows and columns, being it by spatial separation (zones where rows and columns do not overlap), or being it by using a isolating (e.g., electrically non-conductive) layer (e.g. an optically clear adhesive (OCA)) in between. The isolation material may act as dielectric, e.g., at the interception/node zones.

As used in the present disclosure, the term "controller" and "host system" is intended to encompass any suitable processing device. For example, although FIGS. 3A, 3B illustrate a single backend controller 304, touch display device 300 can be implemented using any number of controllers. Indeed, the controller 304 and the host system may be any computer or processing device such as, for example, a blade server, general-purpose personal computer (PC), Macintosh®, workstation, UNIX®-based workstation, or any other suitable device. In other words, the present disclosure contemplates computers other than general purpose computers, as well as computers without conventional operating systems. Further, the illustrated controller 304 and the host system may be adapted to execute any operating system, including Linux®, UNIX®, Windows®, Mac OS®, or any other suitable operating system. The controller and/or host system may be configured to execute any computer instructions or software that can be used to operate the touch display device 300 or that can provide functionality for one or more users of the touch display device 300, wherein the users may activate the functionality through touching predetermined locations on the cover layer 303, and wherein the touched location is associated with an icon displayed by the display layer 302, and wherein the user-initiated touch event is sensed by the sensor grid 301 and the controller 304. In this manner, the user may activate software or hardware functionality by perturbing the electrical field at a node of a row and a column of the sensor grid 301 by using a finger or a conductive object. For example, the perturbation of the electrical field triggers an action of software running on the controller 304 or host system.

Figure 4A:
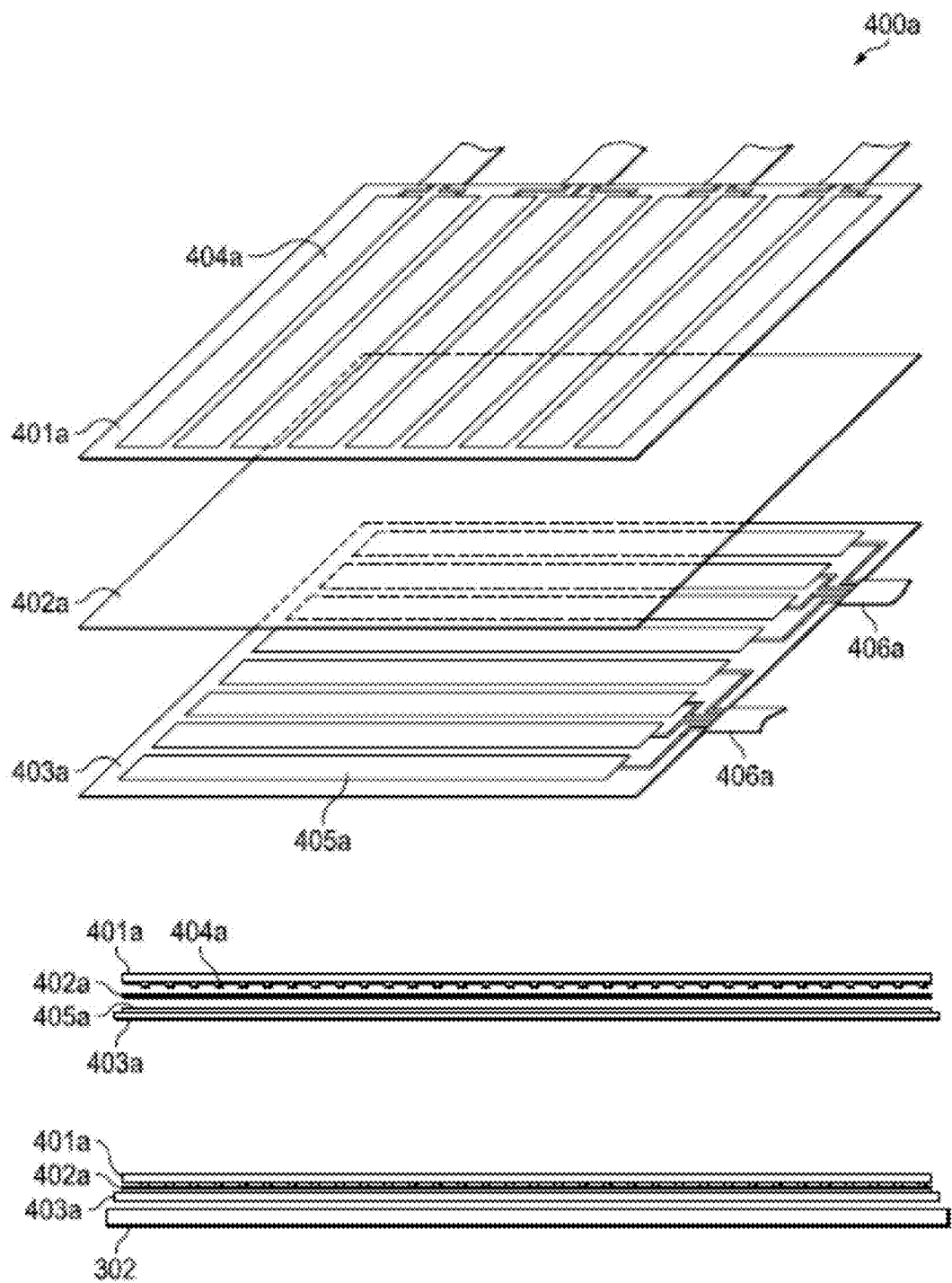
FIG. 4A illustrates layers of the sensor grid in a face-to-face stacking.

FIG. 4A illustrates layers of the sensor grid 301, 400a in a face-to-face stacking according to an embodiment of the present disclosure. The sensor grid may comprise one or more layers, which may be at least one of: conductive row layer 403a, conductive column layer 401a, optically clear adhesives 402a, substrates, covers, or additional dielectric bridges. For example, the sensor grid 301, 400a may include a conductive row layer 403a, a conductive column layer 401a and an optically clear adhesive (OCA) 402a. The rows 405a and columns 404a may be electrodes that are conductively connected via cables or wires 406a with the controller 304. FIG. 4A illustrates the sensor grid before and after lamination, and relative to the display layer 302. The materials used for the bridges and the OCA may be optically clear or transparent, and/or flexible materials, for example, materials with maximum haze below about 1%, and/or, with minimum light transmission, for example, above about 99%, for example an acrylic adhesive. The properties for bridge material may be: transparent, non-conductive, flexible, and/or dielectric constant substantially equivalent to glass, acrylic, or polyester.

The sensor grid layers stacking may be dependable on how the conductive rows and columns are created. There are three layer stacking configurations normally used: separated rows and columns layers facing each other (face to face stacking, FIG. 4A), rows and columns in the same layer (bridged stacking, FIG. 4B), rows and columns on opposite side of the same layer (dual side, FIG. 4C). The substrate layers (where the rows and columns will be created) and the cover layers may be polyethylene terephthalate (PET) films or other types of at least partially transparent (e.g. within or across the visible spectrum) and flexible materials. For example, polymethylpentene (PMP), polypropylene (PP), polycarbonate (PC), polyvinyl chloride (PVC), poly(methyl methacrylate) (PPMA), polystyrene (PS), styrene acrylonitrile (SAN), among others. Also, a flexible glass material can be used. In the next sub-sections, the aforementioned configurations are illustrated.

In this face-to-face stacking configuration 400a, the rows and the columns are created in separated layers, with the printed side facing each other. To isolate them electrically and, at the same time, act as dielectric, and to bond them when laminated, one may use a non-conductive layer of optically clear adhesive (OCA). The flexible cables may be bonded or soldered to the corresponding traces or buses (before or after the layer lamination, depending on the production process used).

Figure 4B:
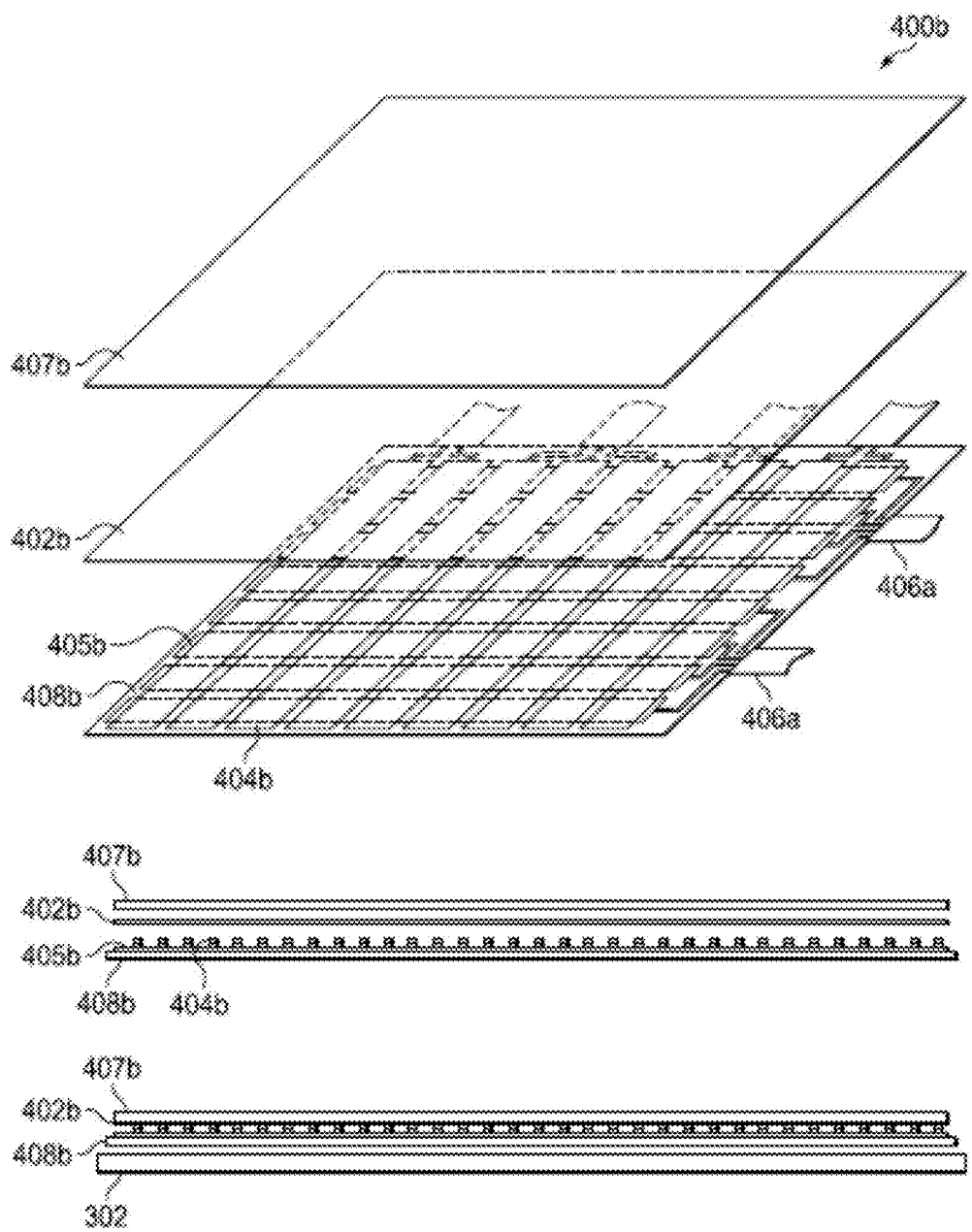
FIG. 4B illustrates layers of the sensor grid in a bridged stacking.

FIG. 4B illustrates layers of the sensor grid 301, 400b in a bridged stacking according to an embodiment of the present disclosure. The sensor grid may comprise one or more layers, which may be at least one of: a layer 408b shared by conductive rows 405b and conductive columns 404b, optically clear adhesives 402b, substrates, covers 407b, or additional dielectric bridges. For example, the sensor grid 301, 400b may include a layer 408b shared by conductive rows 405b and conductive columns 404b (e.g., rows and columns in the same layer 408b), and an optically clear adhesive (OCA) positioned between each row 405b and column 404b at the respective row-column-nodes. The rows 405b and columns 404b may be electrodes that are conductively connected via cables or wires 406a with the controller 304. FIG. 4B illustrates the sensor grid before and after lamination, and relative to the display layer 302.

In this bridged stacking configuration 400b, the rows and the columns may be created in the same layer 408b, having a transparent non-conductive material (e.g. OCA) between them where their projections spatially overlap. These non-conductive material blocks are called dielectric bridges. They may isolate electrically the rows and columns and act as dielectric. Also, it is used a cover layer to close and protect the rows and columns traces and an OCA layer to bond them when laminated. The flexible cables 406a may be bonded or soldered to the corresponding buses (before or after the layer lamination, depending on the production process used).

Figure 4C:
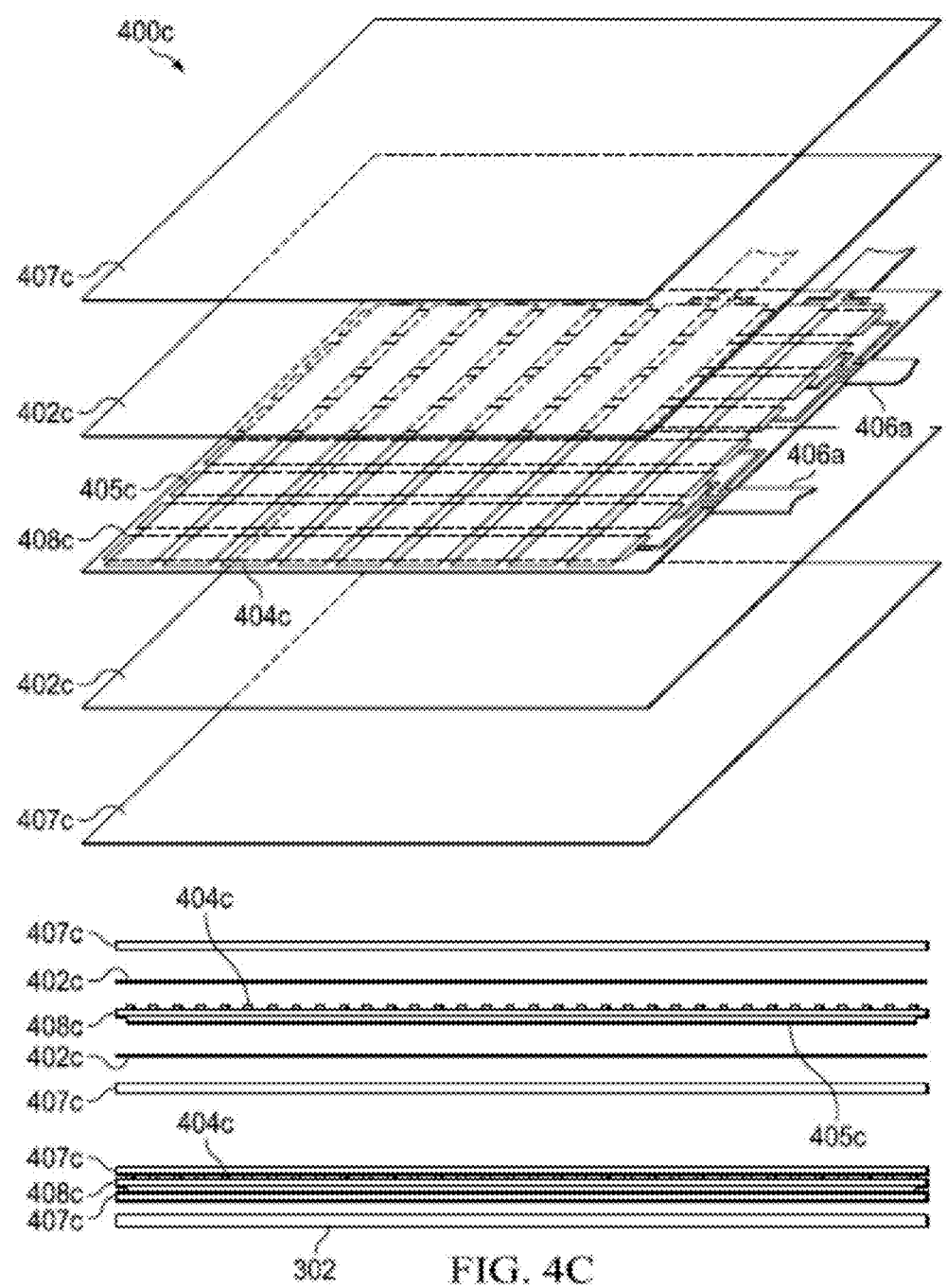
FIG. 4C illustrates layers of the sensor grid in a dual-side stacking.

FIG. 4C illustrates layers of the sensor grid 301, 400c in a dual-side stacking according to an embodiment of the present disclosure. The sensor grid may comprise one or more layers, which may be at least one of: a layer 408c shared by conductive rows 405c and conductive columns 404c, optically clear adhesives 402c, substrates, covers 407c, or additional dielectric bridges. For example, the sensor grid 301, 400c may include a layer 408c shared by conductive rows 405c and conductive columns 404c (e.g., rows and columns on opposite side of the same layer 408c), and one or more optically clear adhesive (OCA) layers positioned between layer 408c and one or more cover layers 407c. The rows 405c and columns 404c may be electrodes that are conductively connected via cables or wires 406c with the controller 304. FIG. 4B illustrates the sensor grid before and after lamination, and relative to the display layer 302.

In this dual-side stacking configuration 400c, the rows and the columns may be created in the same layer 408c, but on opposite sides, e.g., having the layer substrate 408c, the rows are created on the top side (e.g. top surface) and the columns on the bottom side (e.g., bottom surface), or vice-versa, of the shared layer 408c. The substrate layer may act as isolator and a dielectric. One may use a cover layer 407c on each side of the layer 408c to close and protect the rows and columns traces and the one or more OCA layers 402c, e.g., also on each side to bond them when laminated. The flexible cables 406a connect the rows and columns to the controller 304, e.g. cables 406a may be bonded or soldered to the corresponding traces or buses (before or after the layer lamination, depending on the production process used).

As noted above, the sensor grid, or sensor foil, may be located on top of a screen, e.g., an LCD screen, and may interfere with a user's viewing of the screen, especially when the conductive material that makes up the traces of the sensor foil are not transparent, which is typically the case, because the traces are usually metal. With the sensor foil covering a portion of the screen, the sensor may cause a number of visual interference effect such as hazing, blurring, or a moiré effect. To reduce these effects, the traces of the sensor foil should cover as small a portion of the screen as possible without compromising sensitivity of the touch sensing capabilities of the sensor foil. Typically, the transparency range for sensor foils range between eighty-five percent to nearly one hundred percent.

The hazing and blurring effects may be caused by a number of factors such as trace width and trace pitch. With respect to trace width, the traces cover more area as the trace widths increase. With respect to trace pitch, which is the distance from the middle of a trace to the middle of an adjacent trace of an adjacent row or column, the traces cover less area as the trade pitch increases. Sensor foils with large trace widths and small trace pitches will likely cause hazing, blurring, or both when a user views a screen under the sensor foil.

The moiré effect may be tied to a relationship between the trace widths, pitches, patterns, and orientations and the pixel sizes and pitches of the underlying screen. For example, a pixel pitch that is near the trace pitch and a pixel grid that is nearly in line with a trace grid will cause a strong moiré effect with the effect increasing the closer in line the pixel grid and trace grid become. Also, as row traces and column traces approach a perpendicular orientation, the moiré effect becomes more pronounced, with it being strongest when the row traces are perpendicular to the column traces.

Figure 5B:
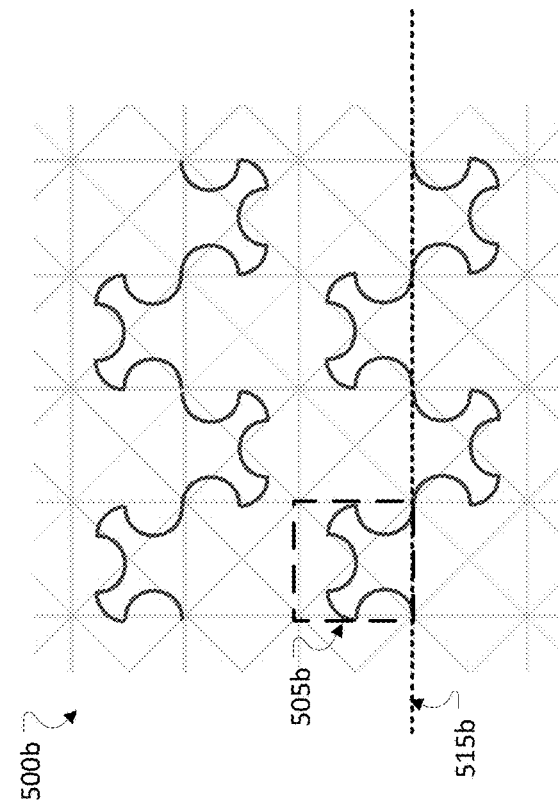
Figure 5A:
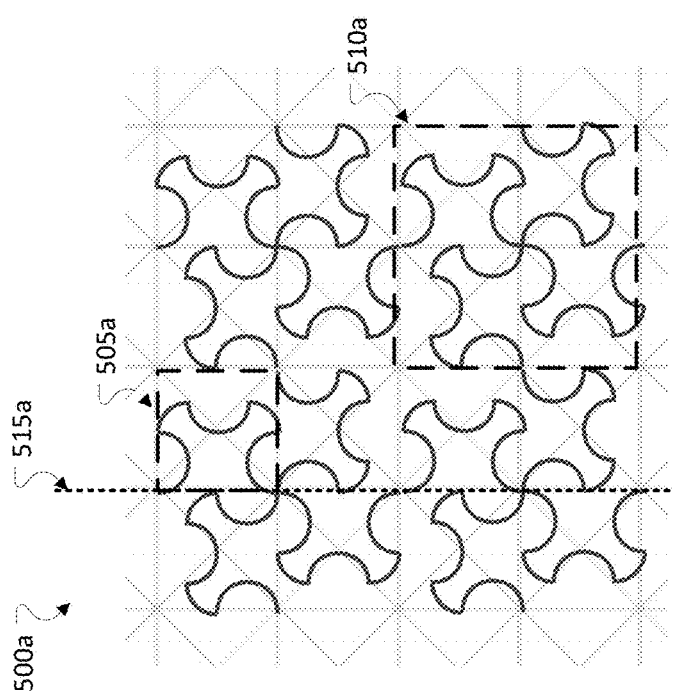

FIG. 5A illustrates an example sensor pattern 500*a*. FIG. 5B illustrates an example row pattern 500*b* of an example sensor. FIG. 5C illustrates an example column pattern 500*c* of an example sensor. The sensor pattern 500*a* is a combination of the row pattern 500*b* and the column pattern 500*c*. The sensor pattern 500*a* may be repeated multiple times in a sensor grid, or sensor foil.

The sensor pattern 500*a* may be divided into cells such as cell 505*a* and cell groups such as cell group 510*a*. The sensor pattern 500*a* that is formed in cell 505*a* may be repeated around a trace axis 515*a* to generate a trace. For example, cell 505*c* is repeated around trace axis 515*c* to generate the traces of column pattern 500*c*. Cell 505*b* is repeated around trace axis 515*b* to generate the traces of row pattern 500*b*.

The sensor pattern 500*a* is constructed using five connected arcs on each cell. Replicating this arc pattern to fill all the sensor foil area generates an organized trace pattern. The pattern 500*a* includes a sequence of rows and columns where the rows are arranged in an independent row layer 500*b* and the columns are arranged in an independent column layer 500*c*, that when overlapped, form one integrated sensor layer 500*a* with touch sensitivity and conductive object detection. In some implementations, the overlap between the column layer 500*c* and row layer 500*b* occurs without the use of a non-conductive physical layer between the column layer 500*c* and row layer 500*b*.

The traces of sensor pattern 500*a* may be made of silver, copper, gold, or other conductive materials. The width of the traces may be between one micrometer and twenty micrometers. Because the sensor pattern 500*a* is not aligned with the pixel grid of the display screen, the sensor patter may exhibit a reduced moiré effect.

In addition to reducing visual interferences, production considerations are also a factor when designing sensor patterns. A sensor pattern should not be so complex as to increase production time or decrease yield to a point where manufacturing of the sensor pattern becomes impractical.

The cell 505*c* of one of the column traces of sensor pattern 500*c* may be divided into different portions. In particular cell 505*c* includes a first portion 550*c*, a second portion 555*c*, a third portion 560*c*, a fourth portion 565*c*, and a fifth portion 570*c*. Each of the portions may be arcs that are defined by a radius. In some implementations, all the radii for cell 505*c* are different, and in some implementations, the radii are the same. In some implementations, the radii of the first portion 550*c*, the third portion 560*c*, and the fifth portion 570*c* are a first distance, and the radii of the second portion 565*c* and the fourth portion 575*c* are a second, different distance. For example, the first distance may be five micrometers and the second distance may be ten micrometers. The first distance may be ten micrometers and the second distance may be five micrometers. The first distance and the second distance may be the same, for example, seven micrometers. In some implementations, the first portion 550*c*, the second portion 555*c*, the third portion 560*c*, the fourth portion 565*c*, and the fifth portion 570*c* may be curved lines other than arcs such as a parabolic curve, elliptical curve, logarithmic curve, exponential curve, or hyperbolic curve.

Figure 6:
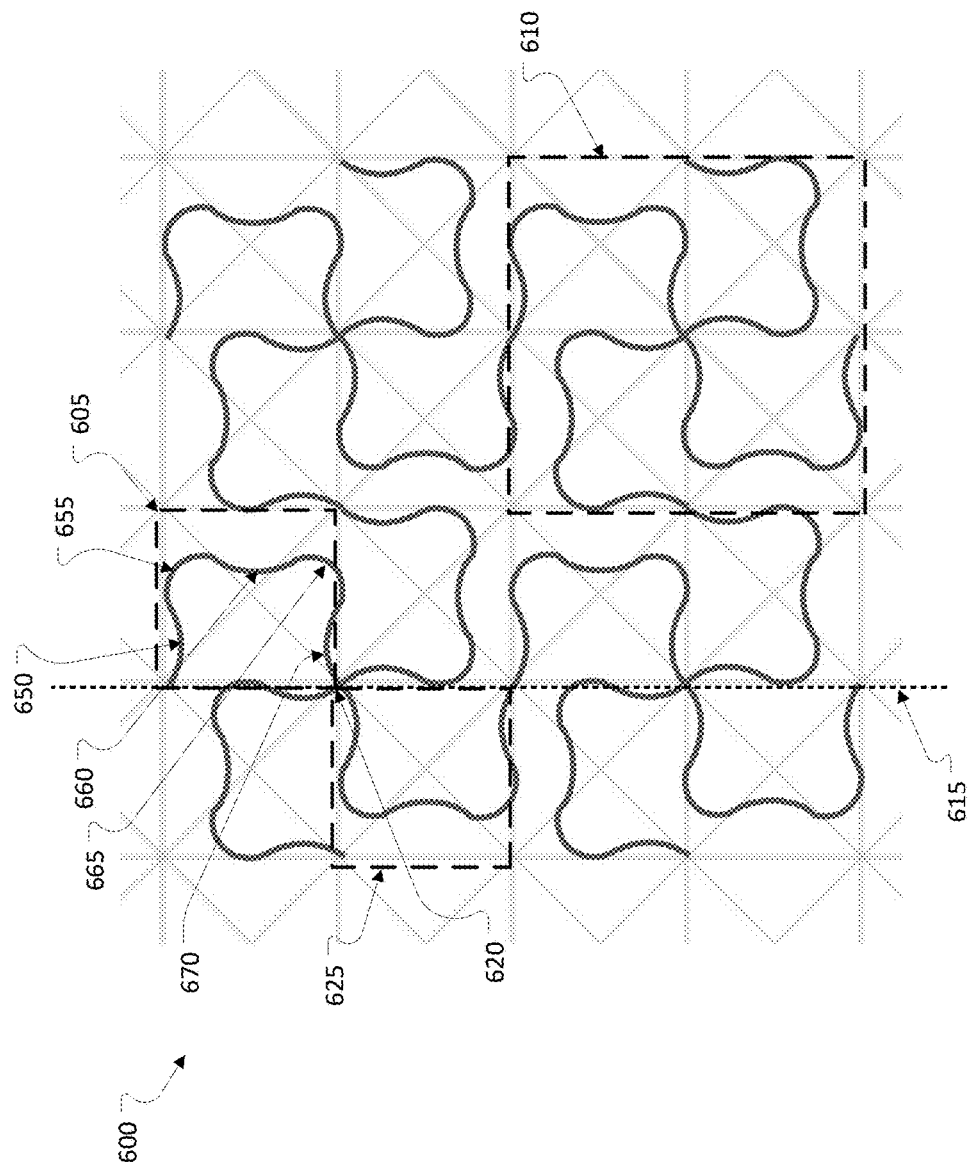

FIG. 6 illustrates an example sensor pattern 600. The sensor pattern 600 is similar to sensor pattern 500*a* except that the arcs that form the sensor pattern 600 have larger radii. The sensor pattern 600 is a pattern that replicates the pattern in cell 605 around a trace axis 615. Cell group 610 includes four cells.

The cell 605 includes five connected arcs that have lager radii than the connected arcs of sensor pattern 500*a*. Therefore the traces of sensor pattern 600 exhibit smoother characteristics than the traces of sensor pattern 500*a*. The length of the overall traces are shorter in sensor pattern 600 than in sensor pattern 500*a* and thus have a lower resistance.

Similar to the sensor pattern 500*a*, a row or column trace may be formed by replicating the cell 605 around the trace axis 615. Cell 625 is a mirror image of cell 605 that is translated along the trace axis 615 the width of the cell 625. In other words, cell 625 is reflectionally symmetrical to the cell 605. Cell 605 and cell 625 may also be considered rotationally symmetrical about the point 620 using one hundred eighty degrees of rotation. These reflections and translations or rotations continue along the trace axis 615 to form a complete row or column trace.

The fill an entire sensor foil with the traces similar to the trace along trace axis 615, the trace along trace axis 615 is replicated. Each new trace includes a trace axis that is parallel to the trace axis 615 to form a complete row group or column group. The complete row group or column group may be rotated ninety degrees to form the other group, whether it be the row or column group. In some implementations, the width of the traces in sensor pattern 600 are between one micrometer and twenty micrometers.

The cell 605 of one of the column traces of sensor pattern 600 may be divided into different portions. In particular, cell 605 includes a first portion 650, a second portion 655, a third portion 660, a fourth portion 665, and a fifth portion 670. Each of the portions may be arcs that are defined by a radius. In some implementations, all the radii for cell 605 are different, and in some implementations, the radii are the same. In some implementations, the radii of the first portion 650, the third portion 660, and the fifth portion 670 are a first distance, and the radii of the second portion 665 and the fourth portion 675 are a second, different distance. For example, the first distance may be ten micrometers and the second distance may be seven micrometers. The first distance may be seven micrometers and the second distance may be ten micrometers. The first distance and the second distance may be the same, for example, eight micrometers. In some implementations, the first portion 650, the second portion 655, the third portion 660, the fourth portion 665, and the fifth portion 670 may be curved lines other than arcs such as a parabolic curve, elliptical curve, logarithmic curve, exponential curve, or hyperbolic curve.

FIG. 7A illustrates an example sensor pattern 700*a*. FIG. 7B illustrates an example row pattern 700*b* of an example sensor. FIG. 7C illustrates an example column pattern 700*c* of an example sensor. The sensor pattern 700*a* is a combination of the row pattern 700*b* and the column pattern 700*c*. The sensor pattern 700*a* may be repeated multiple times in a sensor grid, or sensor foil.

Unlike sensor patterns 500*a* and 600, sensor pattern 700*a* does not include both rotationally symmetric rows and columns. The row traces of row pattern 700*b* are wavy, and the column traces of column pattern 700c are more angular. The wavy traces of sensor pattern 700a avoid moiré interferences when placed over the pixel grid of a display. Additionally, the sensor pattern 700a has a lower production time than sensor patterns 500a and 600. The sensor pattern 700a also has a higher transparency than sensor patterns 500a and 600.

For column pattern 700c, the cell 710c is replicated to produce the column pattern 700c. The trace axis 715c divides the cell 710c and provides a rotation axis about which to rotate the cell 710c. The rotated cell 710c is translated vertically and horizontally to form the column pattern 700c along trace axis 715c and parallel to trace axis 715c. Horizontally translating the portion of sensor pattern 700c without rotating around trace axis 715c yields incorrectly formed columns. Row pattern 700b exhibits rotational symmetry of cell 710a about trace axis 715b. The rotated cells 710a are translated horizontally. Once a row is formed about the trace axis 715b, the complete row is then translated vertically. The row pattern 700b and column pattern 700c combine to form the sensor pattern 700a with trace axis 715b perpendicular to trace axis 715c. In some implementations, the cell 710a is similar in size to cell groups 510a and 610. In some implementations, the cell 710a is similar in size to cell 505a and 605. In some implementations, the width of the traces of sensor pattern 700a are between one micrometer and twenty micrometers.

The cell 710b of one of the row traces of sensor pattern 700b includes a portion 750b of the row trace. The portion 750b may form an arc with a radius. In some implementations, the portion 750b is a curved line other than an arc such as a parabolic curve, elliptical curve, logarithmic curve, exponential curve, or hyperbolic curve.

The cell 710c of one of the column traces of sensor pattern 700c may be divided into different portions. In particular, cell 710c includes a first portion 750c, a second portion 755c, and a third portion 760c. Each of the portions may be arcs that are defined by a radius. In some implementations, all the radii for cell 710c are different, and in some implementations, the radii are the same. The radii for the cell 710c may be the same or different than the radius for cell 710b. In some implementations, the radii of the first portion 750c and the third portion 760c are a first distance, and the radius of the second portion 665 is a second, different distance. For example, the first distance may be twenty micrometers and the second distance may be twenty-five micrometers. The first distance may be fifteen micrometers and the second distance may be thirty micrometers. The first distance and the second distance may be the same, for example, forty micrometers. In some implementations, the first portion 750c, the second portion 755c, and the third portion 760c may be curved lines other than arcs such as a parabolic curve, elliptical curve, logarithmic curve, exponential curve, or hyperbolic curve. In some implementations, the second portion 755c is concave with respect to the trace axis 715c, and in some implementations, the second portion 755c is convex with respect to the trace axis 715c. In some implementations the first portion 750c and the third portion 760c are a same length and shorter than the second portion 755c, when the lengths are defined from endpoint to endpoint for each of the portions.

In some implementations, the curvature of the row traces may be in the same direction or the opposite direction compared to the curvature of the first portion and third portion of the column traces. For example, sensor pattern 700a includes column traces that have first portions and third portions with a same curvature as the portion of the row trace.

Figure 8:
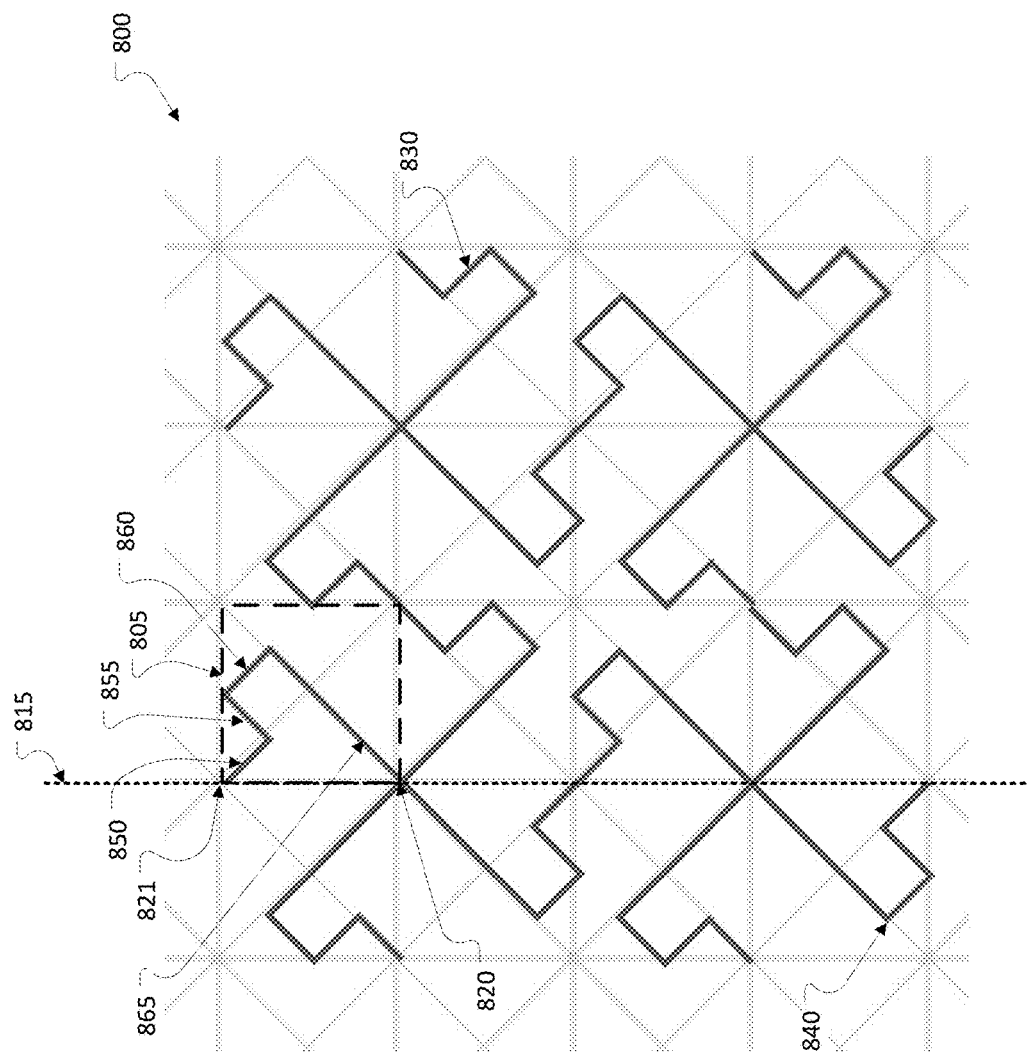
Figure 9:
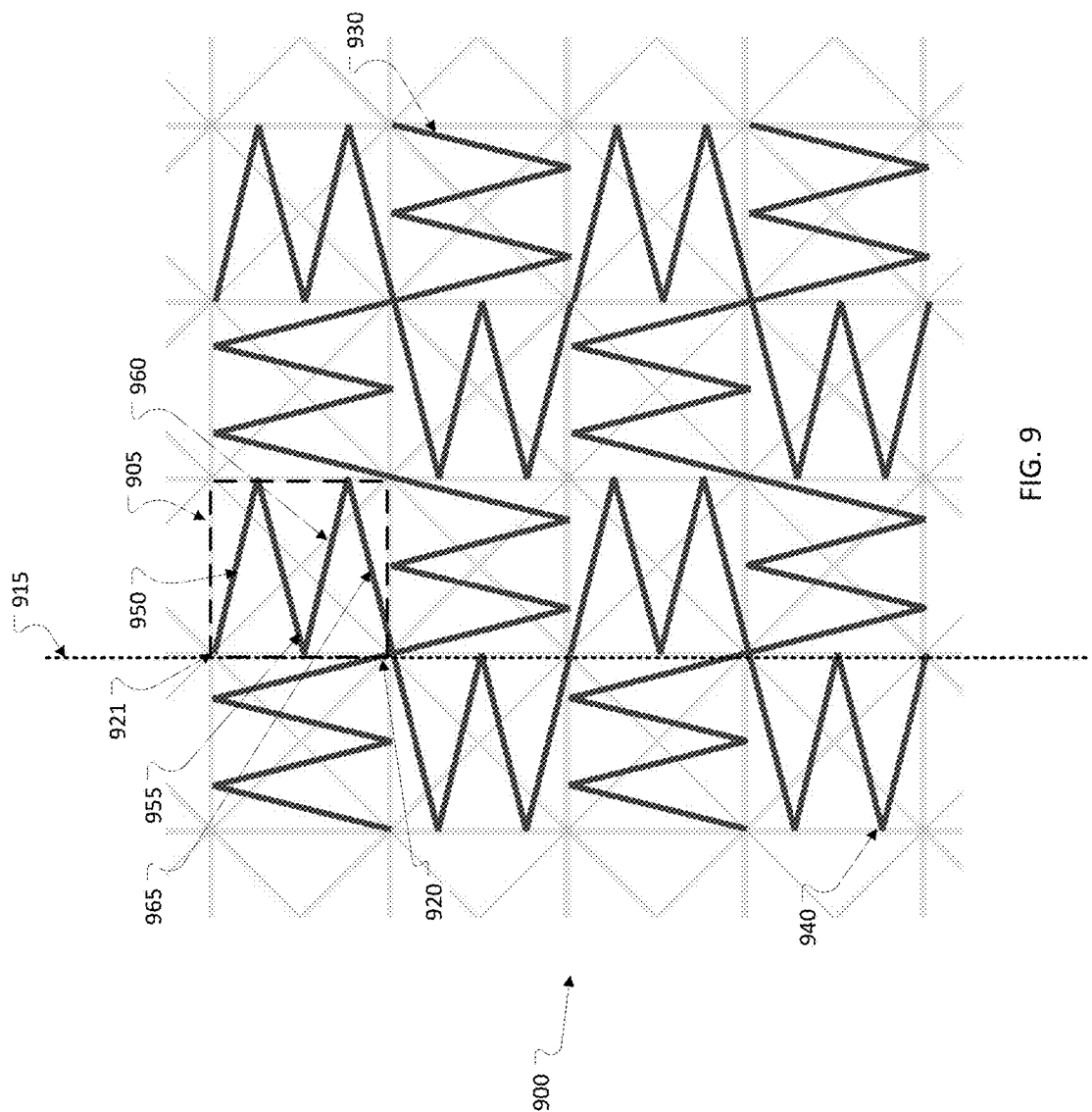
Figure 10:
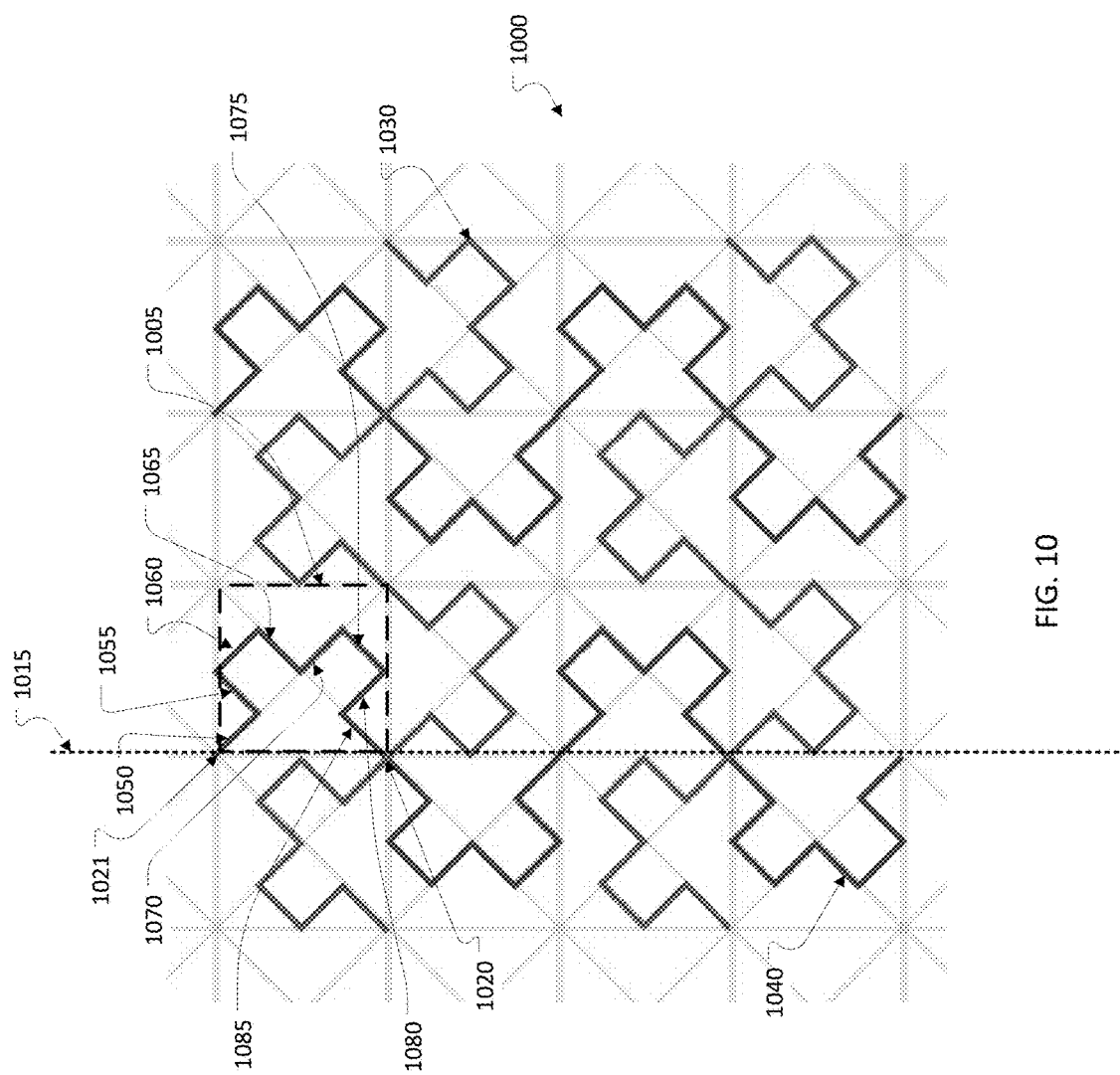

FIGS. 8-10 illustrate example sensor patterns 800, 900, and 1000. Each of the sensor patterns 800, 900, and 1000 include traces formed with straight lines and right angles. This is in contrast to the sensor patterns 500a, 600, and 700a that were formed with curved lines. Similar to sensor patterns 500a and 600, sensor patterns 800, 900, and 1000 exhibit rotational symmetry about a point on a trace axis.

Sensor pattern 800 includes example column trace 840 that has a trace axis 815 and cell 805. The cell 805 includes four trace portions. Three of the trace portions are about the same length and a fourth trace portion is about three times the length of the other trace portions. Each of the trace portions makes electrical contact with another trace portion at about a ninety degree angle.

To form column trace 840, cell 805 is rotated one hundred eighty degrees about point 820. Rotation about points on the trace axis 815 continues in order to complete forming of the column trace 840. The sensor pattern 840 includes additional column traces that include trace axes that are parallel to trace axis 815. The row traces, including row trace 830, are formed by rotating the column traces ninety degrees. The row traces and column traces overlap at rotation points that are located on the trace axes. For example, row trace 830 and column trace 840 overlap, but do not make direct electrical contact, at point 820.

In some implementations, the row and column traces of sensor pattern 800 are between one micrometer and twenty micrometers. The trace widths, angles, and lengths may vary within a particular tolerance. For example, the tolerance of the angles where the portions of column trace 840 meet may be less than one percent, less than two percent, or another percent. One angle between two portions may be eighty-nine degrees, and another angle may be ninety-one degrees. One trace portion may be 1.01 times the length of another trace portion.

The cell 805 of column trace 840 of sensor pattern 800 may be divided into different portions. In particular, cell 805 includes a first portion 850, a second portion 855, a third portion 860, and a fourth portion 865. The fourth portion 865 includes an endpoint at point 820, and the first portion 850 includes an endpoint at point 821. Each of the portions may be straight and have a particular length. In some implementations, all the lengths of the portions for cell 805 are different, and in some implementations, all the lengths are the same. In some implementations, the lengths of the first portion 850, the second portion 855, and the third portion 860 are first distance, and the length of the fourth portion 865 is a second, different distance. For example, the first distance may be three micrometers and the second distance may be ten micrometers. The first distance may be seven micrometers and the second distance may be fourteen micrometers. The first distance and the second distance may be the same, for example, five micrometers. In some implementations, the first portion 850, the second portion 855, the third portion 860, and the fourth portion 865 meet at ninety degree angles. In some implementations, the first portion 850, the second portion 855, the third portion 860, and the fourth portion 865 meet at angles between eighty degrees and one hundred degrees. In some implementations, the first portion 850, the second portion 855, the third portion 860, and the fourth portion 865 may be curved lines such as arcs, parabolic curves, elliptical curves, logarithmic curves, exponential curves, or hyperbolic curves.

Sensor pattern 900 includes example column trace 940 that has a trace axis 915 and cell 905. The cell 915 includes four trace portions. Each of the trace portions are about the same length. Each of the trace portions within the cell 905 makes electrical contact with another trace portion at about a twenty-eight degree angle.

To form column trace 940, cell 905 is rotated one hundred eighty degrees about point 920. Rotation about points on the trace axis 915 continues in order to complete forming of the column trace 940. The sensor pattern 940 includes additional column traces that include trace axes that are parallel to trace axis 915. The row traces, including row trace 930, are formed by rotating the column traces ninety degrees. The row traces and column traces overlap at rotation points that are located on the trace axes. For example, row trace 930 and column trace 940 overlap, but do not make direct electrical contact, at point 920.

In some implementations, the row and column traces of sensor pattern 900 are between one micrometer and twenty micrometers. The trace widths, angles, and lengths may vary within a particular tolerance. For example, the tolerance of the angles where the portions of column trace 840 meet may be less than one percent, less than two percent, or another percent. One angle between two portions may be twenty-seven degrees, and another angle may be twenty-nine degrees. One trace portion may be 1.02 times the length of another trace portion.

The cell 905 of column trace 940 of sensor pattern 900 may be divided into different portions. In particular, cell 905 includes a first portion 950, a second portion 955, a third portion 960, and a fourth portion 965. The fourth portion 965 includes an endpoint at point 920, and the first portion 950 includes an endpoint at point 921. Each of the portions may be straight and have a particular length. In some implementations, all the lengths of the portions for cell 905 are different, and in some implementations, all the lengths are the same. In some implementations, the lengths of the first portion 950 and the fourth portion 965 are first distance, and the lengths of the second portion 955 and the third portion 960 are a second, different distance. For example, the first distance may be three micrometers and the second distance may be ten micrometers. The first distance may be eight micrometers and the second distance may be four micrometers. The first distance and the second distance may be the same, for example, five micrometers. In some implementations, the first portion 850, the second portion 855, the third portion 860, and the fourth portion 865 meet at twenty-nine degree angles. In some implementations, the first portion 850, the second portion 855, the third portion 860, and the fourth portion 865 meet at angles between twenty degrees and forty degrees. In some implementations, the first portion 850, the second portion 855, the third portion 860, and the fourth portion 865 may be curved lines such as arcs, parabolic curves, elliptical curves, logarithmic curves, exponential curves, or hyperbolic curves.

Sensor pattern 1000 includes example column trace 1040 that has a trace axis 1015 and cell 1005. The cell 1015 includes eight trace portions. Each of the trace portions are about the same length. Each of the trace portions within cell 1005 makes electrical contract with another trace portion at about a ninety degree angle.

To form column trace 1040, cell 1005 is rotated one hundred eighty degrees about point 1020. Rotation about points on the trace axis 1015 continues in order to complete forming of the column trace 1040. The sensor pattern 1040 includes additional column traces that include trace axes that are parallel to trace axis 1015. The row traces, including row trace 1030, are formed by rotating the column traces ninety degrees. The row traces and column traces overlap at rotation points that are located on the trace axes. For example, row trace 1030 and column trace 1040 overlap, but do not make direct electrical contact, at point 1020.

In some implementations, the row and column traces of sensor pattern 1000 are between one micrometer and twenty micrometers. The trace widths, angles, and lengths may vary within a particular tolerance. For example, the tolerance of the angles where the portions of column trace 1040 meet may be less than one percent, less than two percent, or another percent. One angle between two portions may be eighty-eight degrees, and another angle may be ninety-two degrees. One trace portion may be 1.02 times the length of another trace portion. Each of the tolerance examples described may apply to any of the trace patterns in any combination.

The cell 1005 of column trace 1040 of sensor pattern 1000 may be divided into different portions. In particular, cell 1005 includes a first portion 1050, a second portion 1055, a third portion 1060, a fourth portion 1065, a fifth portion 1070, a sixth portion 1075, a seventh portion 1080, and an eighth portion 1085. The eighth portion 1085 includes an endpoint at point 1020, and the first portion 1050 includes an endpoint at point 1021. Each of the portions may be straight and have a particular length. In some implementations, all the lengths of the portions for cell 1005 are different, and in some implementations, all the lengths are the same.

In some implementations, the lengths of the first portion 1050, the second portion 1055, fourth portions 1065, fifth portions 1070, seventh portions 1080, and eighth portions 1085 are first distance, and the lengths of the third portion 1060 and the sixth 1075 are a second, different distance. For example, the first distance may be three micrometers and the second distance may be ten micrometers. The first distance may be eight micrometers and the second distance may be five micrometers. The first distance and the second distance may be the same, for example, six micrometers. In some implementations, the first portion 1050, the second portion 1055, the third portion 1060, the fourth portion 1065, the fifth portion 1070, the sixth portion 1075, the seventh portion 1080, and the eighth portion 1085 meet at ninety degree angles. In some implementations, the first portion 1050, the second portion 1055, the third portion 1060, the fourth portion 1065, the fifth portion 1070, the sixth portion 1075, the seventh portion 1080, and the eighth portion 1085 meet at angles between eighty degrees and one hundred degrees. In some implementations, the first portion 1050, the second portion 1055, the third portion 1060, the fourth portion 1065, the fifth portion 1070, the sixth portion 1075, the seventh portion 1080, and the eighth portion 1085 may be curved lines such as arcs, parabolic curves, elliptical curves, logarithmic curves, exponential curves, or hyperbolic curves.

In some implementations, the column traces may be rotated at angles other than ninety degrees to form the row traces. For example, the column traces may be rotated at angles between thirty degrees and sixty degrees, between forty-five degrees and seventy-five degrees, or between sixty degrees and ninety degrees. In some implementations, the cells may be rotated at angles other than one hundred eighty degrees about points on the trace axis. For example, cell 805 may be rotated between one hundred twenty degrees and two hundred forty degrees. When cells are rotated at angles other than one hundred eighty degrees the subsequent rotation of the cell should be adjusted so that the trace continues along the trace axis. For example, cell 1005 may be rotated about point 1020 one hundred seventy degrees. To continue forming column trace 1040, the subsequent cell is rotated one hundred ninety degrees. Adjusting the rotation angles reduces the moiré effect.

In some implementations, different sensor patterns are combined to create one sensor grid. For example, sensor pattern 800 may form the center of a sensor grid and sensor pattern 900 may form the edges of the sensor grid. In some implementations, columns from one sensor pattern are combined with rows from another sensor pattern. For example, the column pattern 500c may form the columns of the sensor grid and row pattern 700b may form the rows of the sensor grid. Sensor patterns with mixed rows and columns may be combined with other sensor patterns that may or may not have mixed rows and columns. For example, the sensor pattern with column pattern 500c and row pattern 700b may form the center of the sensor grid and sensor pattern 1000 may form the edges. Because sensor grids typically exhibit lower sensitivity around the edges, designers may select edge sensor patterns that have higher sensitivity performance even if the visual interference is degraded. Designers may select sensor patterns with less visual interference for the middle of a sensor grid even if the selected sensor patterns exhibit lower sensitivity.

The following tables illustrate various performance metrics for the various sensor patterns. Table 1 shows the production time for each of the presented sensor patterns.

TABLE 1

Sensor production times for each sensor pattern

| | Sensor Production Time (hours) | | | | |
|---|---|---|---|---|---|
| | FIG. 10 | FIG. 8 | FIG. 6 | FIG. 9 | FIG. 5A | FIG. 7A |
| 64 rows × 64 columns | 5.13 | 2.18 | 1.45 | 2.6 | 1.49 | 0.47 |
| 48 rows × 84 columns | 4.1 | 2.11 | 1.46 | 2.59 | 1.57 | 0.43 |
| 96 rows × 168 columns | 14.3 | 4.09 | 5.04 | 9.5 | 5.41 | 2.24 |

Table 2 shows the results of empirical tests for each of the presented sensor patterns. Production time refers to the time required to produce a sensor grid using a particular sensor pattern. Transparency refers to the ability of the user to view the display under the sensor grid. The transparency of all the sensor patterns is greater than ninety-five percent. Visual interference refers to interference such as moiré interference, hazing, and blurring. Trace pitch variation refers to the tolerance level for each trace pitch, or the distance between neighboring rows or neighboring columns. Trace length refers to the total length of a particular trace instead of just the length of the particular trace's trace axis. Typically longer traces are more expensive to produce because of the additional material for each trace. Sensor pattern 1000 is well performing, but has the longest production time and trace length. Sensor pattern 600 has an acceptable production time and acceptable performance. Sensor pattern 700a has a low production time and low trace length, but high visual interference.

TABLE 2

Empirical test results

| | Production time | Transparency | Visual interference | Trace pitch variation | Trace length | Conclusions |
|---|---|---|---|---|---|---|
| FIG. 10 | Very high | High | Low | Low | High | Well performing |
| FIG. 8 | High | High | Acceptable | Medium | Medium | |
| FIG. 6 | Acceptable | High | Low | Medium | Medium | Acceptable trade-offs |
| FIG. 9 | High | Acceptable | High | Low | High | |
| FIG. 5A | Acceptable | High | Low | Low | High | |
| FIG. 7A | Low | Very High | High | Low | Low | Lower cost |

Figure 11:
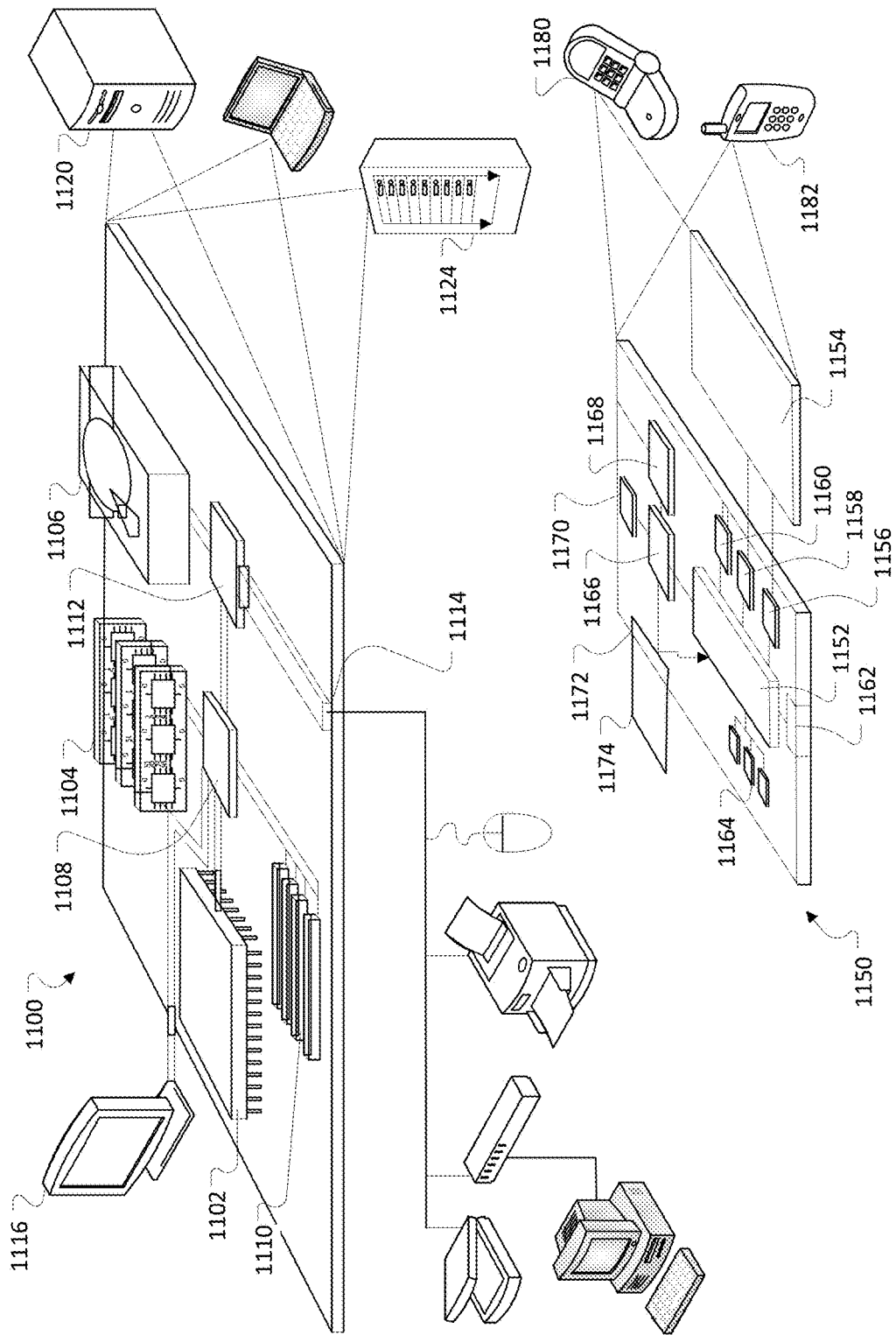
FIG. 11 shows an example of a computing device and a mobile computing device.

FIG. 11 shows an example of a computing device 1100 and a mobile computing device 1150 that can be used to implement the techniques and methods described here. The computing device 1100 is intended to represent various forms of digital computers, such as laptops, desktops, workstations, personal digital assistants, servers, blade servers, mainframes, and other appropriate computers. The mobile computing device 1150 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 1100 includes a processor 1102, a memory 1104, a storage device 1106, a high-speed interface 1108 connecting to the memory 1104 and multiple high-speed expansion ports 1110, and a low-speed interface 1112 connecting to a low-speed expansion port 1114 and the storage device 1106. Each of the processor 1102, the memory 1104, the storage device 1106, the high-speed interface 1108, the high-speed expansion ports 1110, and the low-speed interface 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as a display 1116 coupled to the high-speed interface 1108. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 1104 stores information within the computing device 1100. In some implementations, the memory 1104 is a volatile memory unit or units. In some implementations, the memory 1104 is a non-volatile memory unit or units. The memory 1104 may also be another form of computer-readable medium, such as a magnetic or optical disk.

The storage device 1106 is capable of providing mass storage for the computing device 1100. In some implementations, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 1102), perform one or more methods, such as those described above. The instructions can also be stored by one or more storage devices such as computer- or machine-readable mediums (for example, the memory 1104, the storage device 1106, or memory on the processor 1102).

The high-speed interface 1108 manages bandwidth-intensive operations for the computing device 1100, while the low-speed interface 1112 manages lower bandwidth-intensive operations. Such allocation of functions is an example only. In some implementations, the high-speed interface 1108 is coupled to the memory 1104, the display 1116 (e.g., through a graphics processor or accelerator), and to the high-speed expansion ports 1110, which may accept various expansion cards (not shown). In the implementation, the low-speed interface 1112 is coupled to the storage device 1106 and the low-speed expansion port 1114. The low-speed expansion port 1114, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. In addition, it may be implemented in a personal computer such as a laptop computer 1122. It may also be implemented as part of a rack server system 1124. Alternatively, components from the computing device 1100 may be combined with other components in a mobile device (not shown), such as a mobile computing device 1150. Each of such devices may contain one or more of the computing device 1100 and the mobile computing device 1150, and an entire system may be made up of multiple computing devices communicating with each other.

The mobile computing device 1150 includes a processor 1152, a memory 1164, an input/output device such as a display 1154, a communication interface 1166, and a transceiver 1168, among other components. The mobile computing device 1150 may also be provided with a storage device, such as a micro-drive or other device, to provide additional storage. Each of the processor 1152, the memory 1164, the display 1154, the communication interface 1166, and the transceiver 1168, are interconnected using various buses, and several of the components may be mounted on a common motherboard or in other manners as appropriate.

The processor 1152 can execute instructions within the mobile computing device 1150, including instructions stored in the memory 1164. The processor 1152 may be implemented as a chipset of chips that include separate and multiple analog and digital processors. The processor 1152 may provide, for example, for coordination of the other components of the mobile computing device 1150, such as control of user interfaces, applications run by the mobile computing device 1150, and wireless communication by the mobile computing device 1150.

The processor 1152 may communicate with a user through a control interface 1158 and a display interface 1156 coupled to the display 1154. The display 1154 may be, for example, a TFT (Thin-Film-Transistor Liquid Crystal Display) display or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may provide communication with the processor 1152, so as to enable near area communication of the mobile computing device 1150 with other devices. The external interface 1162 may provide, for example, for wired communication in some implementations, or for wireless communication in other implementations, and multiple interfaces may also be used.

The memory 1164 stores information within the mobile computing device 1150. The memory 1164 can be implemented as one or more of a computer-readable medium or media, a volatile memory unit or units, or a non-volatile memory unit or units. An expansion memory 1174 may also be provided and connected to the mobile computing device 1150 through an expansion interface 1172, which may include, for example, a SIMM (Single In Line Memory Module) card interface. The expansion memory 1174 may provide extra storage space for the mobile computing device 1150, or may also store applications or other information for the mobile computing device 1150. Specifically, the expansion memory 1174 may include instructions to carry out or supplement the processes described above, and may include secure information also. Thus, for example, the expansion memory 1174 may be provide as a security module for the mobile computing device 1150, and may be programmed with instructions that permit secure use of the mobile computing device 1150. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that, when executed by one or more processing devices (for example, processor 1152), perform one or more methods, such as those described above. The instructions can also be stored by one or more storage devices, such as one or more computer- or machine-readable mediums (for example, the memory 1164, the expansion memory 1174, or memory on the processor 1152). In some implementations, the instructions can be received in a propagated signal, for example, over the transceiver 1168 or the external interface 1162.

The mobile computing device 1150 may communicate wirelessly through the communication interface 1166, which may include digital signal processing circuitry where necessary. The communication interface 1166 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1168 using a radio-frequency. In addition, short-range communication may occur, such as using a Bluetooth, WiFi, or other such transceiver (not shown). In addition, a GPS (Global Positioning System) receiver module 1170 may provide additional navigationand location-related wireless data to the mobile computing device 1150, which may be used as appropriate by applications running on the mobile computing device 1150.

The mobile computing device 1150 may also communicate audibly using an audio codec 1160, which may receive spoken information from a user and convert it to usable digital information. The audio codec 1160 may likewise generate audible sound for a user, such as through a speaker, e.g., in a handset of the mobile computing device 1150. Such sound may include sound from voice telephone calls, may include recorded sound (e.g., voice messages, music files, etc.) and may also include sound generated by applications operating on the mobile computing device 1150.

The mobile computing device 1150 may be implemented in a number of different forms, as shown in the figure. For example, it may be implemented as a cellular telephone 1180. It may also be implemented as part of a smart-phone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A projected capacitive touch sensor, comprising:
   a sensor grid (a) that includes a trace that (i) has a trace start point and a trace end point, (ii) is electrically conductive between the trace start point and the trace end point, and (iii) is formed in one or more pairs of trace cells that each include a first trace cell and a second trace cell that is rotationally symmetrical to the first trace cell and (b) that includes additional traces that each (i) have trace axes that are approximately perpendicular to a trace axis of the trace and (ii) are radially symmetrical to the trace,
   wherein the trace start point and the trace end point define the trace axis,
   wherein a trace direction is defined from the trace start point to the trace end point,
   wherein a trace-perpendicular direction is defined as being perpendicular to the trace direction,
   wherein a segment of the trace that is formed in the first trace cell comprises:
      a first portion of the trace that starts at a first point on the trace axis and that is formed in the trace direction and in the trace-perpendicular direction;
      a second portion of the trace that starts at an end point of the first portion and that is formed in a direction opposite the trace direction and in the trace-perpendicular direction;
      a third portion of the trace that starts at an end point of the second portion and that is formed in the trace direction and in the trace-perpendicular direction;
      a fourth portion of the trace that starts at an end point of the third portion and that is formed in the trace direction and in a direction opposite the trace-perpendicular direction;
      a fifth portion of the trace that starts at an end point of the fourth portion and that is formed in the trace direction and the trace-perpendicular direction;
      a sixth portion of the trace that starts at an end point of the fifth portion and that is formed in the trace direction and the direction opposite trace-perpendicular direction;
      a seventh portion of the trace that starts at an end point of the sixth portion and that is formed in the direction opposite the trace direction and the direction opposite trace-perpendicular direction; and an eighth portion of the trace that starts at an end point of the seventh portion, that ends at a second point on the trace axis, and that is formed in the trace direction and the direction opposite trace-perpendicular direction.

2. The sensor of claim 1, wherein a width of the trace is between one micrometer and twenty micrometers.

3. The sensor of claim 1, wherein the sensor grid includes: additional traces that each have trace axes that are approximately parallel to the trace axis of the trace.

4. A projected capacitive touch sensor, comprising:
a sensor grid (a) that includes a trace that (i) has a trace start point and a trace end point, (ii) is electrically conductive between the trace start point and the trace end point, and (iii) is formed in one or more pairs of trace cells that each include a first trace cell and a second trace cell that is rotationally symmetrical to the first trace cell and (b) that includes additional traces that each (i) have trace axes that are approximately perpendicular to a trace axis of the trace and (ii) are radially symmetrical to the trace,
wherein the trace start point and the trace end point define the trace axis,
wherein a trace direction is defined from the trace start point to the trace end point,
wherein a trace-perpendicular direction is defined as being perpendicular to the trace direction,
wherein a segment of the trace that is formed in the first trace cell comprises:
a first portion of the trace that starts at a first point on the trace axis and that is formed in the trace direction and in the trace-perpendicular direction;
a second portion of the trace that starts at an end point of the first portion and that is formed in a direction opposite the trace direction and in the trace-perpendicular direction;
a third portion of the trace that starts at an end point of the second portion and that is formed in the trace direction and in the trace-perpendicular direction;
a fourth portion of the trace that starts at an end point of the third portion, that ends at a second point on the trace axis, and that is formed in the trace direction and in a direction opposite the trace-perpendicular direction.

5. The sensor of claim 4, wherein a width of the trace is between one micrometer and twenty micrometers.

6. The sensor of claim 4, wherein the sensor grid includes: additional traces that each have trace axes that are approximately parallel to the trace axis of the trace.

7. The sensor of claim 4, wherein a length of the fourth portion is at least twice a length of the first portion, the second portion, or the third portion.

8. A projected capacitive touch sensor, comprising:
a sensor grid (a) that includes a trace that (i) has a trace start point and a trace end point, (ii) is electrically conductive between the trace start point and the trace end point, and (iii) is formed in one or more pairs of trace cells that each include a first trace cell and a second trace cell that is rotationally symmetrical to the first trace cell and (b) that includes additional traces that each (i) have trace axes that are approximately perpendicular to a trace axis of the trace and (ii) are radially symmetrical to the trace,
wherein the trace start point and the trace end point define the trace axis,
wherein a trace direction is defined from the trace start point to the trace end point,
wherein a trace-perpendicular direction is defined as being perpendicular to the trace direction,
wherein a segment of the trace that is formed in the first trace cell comprises:
a first portion of the trace that starts at a first point on the trace axis and that is formed in the trace direction and in the trace-perpendicular direction;
a second portion of the trace that starts at an end point of the first portion and that is formed in the trace direction and in a direction that is opposite the trace-perpendicular direction;
a third portion of the trace that starts at an end point of the second portion and that is formed in the trace direction and in the trace-perpendicular direction;
a fourth portion of the trace that starts at an end point of the third portion, that ends at a second point on the trace axis, and that is formed in the trace direction and in the direction opposite the trace-perpendicular direction.

9. The sensor of claim 8, wherein a width of the trace is between one micrometer and twenty micrometers.

10. The sensor of claim 8, wherein sensor grid includes: additional traces that each have trace axes that are approximately parallel to the trace axis of the trace.

11. A projected capacitive touch sensor, comprising:
a sensor grid that includes a trace that (i) has a trace start point and a trace end point, (ii) is electrically conductive between the trace start point and the trace end point, and (iii) is formed in one or more pairs of trace cells that each include a first trace cell and a second trace cell that is rotationally symmetrical to the first trace cell,
wherein the trace start point and the trace end point define a trace axis,
wherein a trace direction is defined from the trace start point to the trace end point,
wherein a trace-perpendicular direction is defined as being perpendicular to the trace direction,
wherein a segment of the trace that is formed in the first trace cell comprises:
a first curved portion of the trace that starts at a first point on the trace axis and that is concave in a direction opposite the trace direction;
a second curved portion of the trace that starts at an end point of the first curved portion and that is convex in a direction opposite the trace direction and in the trace-perpendicular direction;
a third curved portion of the trace that starts at an end point of the second curved portion and that is concave in the trace-perpendicular direction;
a fourth curved portion of the trace that starts at an end point of the third curved portion and that is convex in the trace direction and in the trace-perpendicular direction;
a fifth curved portion of the trace that starts at an end point of the fourth curved portion, that ends at a second point on the trace axis and that is concave in the trace direction.

12. The sensor of claim 11, wherein a width of the trace is between one micrometer and twenty micrometers.

13. The sensor of claim 11, wherein the sensor grid includes:
additional traces that each have trace axes that are approximately parallel to the trace axis of the trace.

14. The sensor of claim 11, wherein the sensor grid includes:
   additional traces that each (i) have trace axes that are approximately perpendicular to the trace axis of the trace and (ii) are radially symmetrical to the trace.

15. The sensor of claim 11, wherein the first curved portion, the second curved portion, the third curved portion, the fourth curved portion, and the fifth curved portion are arcs with a same radius.

16. The sensor of claim 11, wherein:
   the first curved portion, the third curved portion, and the fifth curved portion are arcs with a first radius, and
   the second curved portion and the fourth curved portion are arcs with a second radius that is greater than the first radius.

17. The sensor of claim 11, wherein:
   the first curved portion, the third curved portion, and the fifth curved portion are arcs with a first radius.

\* \* \* \* \*

UNITED STATES PATENT AND TRADEMARK OFFICE
CERTIFICATE OF CORRECTION

PATENT NO.            : 9,958,996 B2                                    Page 1 of 1
APPLICATION NO.       : 15/010086
DATED                 : May 1, 2018
INVENTOR(S)           : Pedro Luis Fernandes Marques et al.

It is certified that error appears in the above-identified patent and that said Letters Patent is hereby corrected as shown below:

On the Title Page

Column 1 ([*] Notice), Line 3, after "0 days." delete "days.";

In the Claims

Column 23, Line 18, Claim 17, delete "radius." and insert -- radius, and the second curved portion and the fourth curved portion are arcs with a second radius that is less than the first radius. --.

Signed and Sealed this
Thirtieth Day of June, 2020

Andrei Iancu
*Director of the United States Patent and Trademark Office*